(12) United States Patent
Yoshida et al.

(10) Patent No.: US 12,463,223 B2
(45) Date of Patent: Nov. 4, 2025

(54) ELECTRODE FOR BATTERY, BATTERY HAVING ELECTRODE AND METHOD FOR MANUFACTURING ELECTRODE AND BATTERY HAVING ELECTRODE

(71) Applicant: NEC Corporation, Tokyo (JP)

(72) Inventors: Noboru Yoshida, Tokyo (JP); Makihiro Otohata, Tokyo (JP); Shinya Sudo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/126,123

(22) Filed: Mar. 24, 2023

(65) Prior Publication Data

US 2023/0253566 A1    Aug. 10, 2023

Related U.S. Application Data

(63) Continuation of application No. 16/086,188, filed as application No. PCT/JP2017/018650 on May 18, 2017, now abandoned.

(30) Foreign Application Priority Data

May 25, 2016 (JP) .................................. 2016-104345

(51) Int. Cl.
*H01M 4/66* (2006.01)
*H01M 4/02* (2006.01)
(Continued)

(52) U.S. Cl.
CPC ......... *H01M 4/661* (2013.01); *H01M 4/0433* (2013.01); *H01M 4/364* (2013.01);
(Continued)

(58) Field of Classification Search
CPC .... H01M 4/661; H01M 4/0433; H01M 4/364; H01M 4/66; H01M 4/04; H01M 4/36;
(Continued)

(56) References Cited

U.S. PATENT DOCUMENTS 5,981,107 A * 11/1999 Hamano ............... H01M 10/05
429/231.95
6,589,690 B1    7/2003 Sato et al.
(Continued)

FOREIGN PATENT DOCUMENTS

CN          1273439 A      11/2000
CN          101378135      3/2009
(Continued)

OTHER PUBLICATIONS

International Search Report mailed Jul. 18, 2017. In corresponding PCT International Application.
(Continued)

*Primary Examiner* — Adam J Francis
(74) *Attorney, Agent, or Firm* — Sughrue Mion, PLLC

(57) ABSTRACT

Provided is an electrode for a battery which effectively suppress a short circuit between a positive electrode and a negative electrode at high temperature of the battery.
The electrode includes a current collector 110, an active material layer 111 formed on at least one side of the current collector 110 and an insulating layer 112 formed on the surface of the active material layer 111. The electrode was formed so that peeling occurs between the current collector 110 and the active material layer 111 and the peeling strength was 10 mN/mm or more when a 90° peeling test was performed at a peeling rate of 100/min.

19 Claims, 12 Drawing Sheets

(51) Int. Cl.
*H01M 4/04* (2006.01)
*H01M 4/131* (2010.01)
*H01M 4/36* (2006.01)
*H01M 4/62* (2006.01)
*H01M 10/0525* (2010.01)
*H01M 10/0569* (2010.01)
*H01M 50/46* (2021.01)

(52) U.S. Cl.
CPC ........... *H01M 4/366* (2013.01); *H01M 4/623* (2013.01); *H01M 10/0525* (2013.01); *H01M 10/0569* (2013.01); *H01M 50/46* (2021.01); *H01M 2004/021* (2013.01); *H01M 2004/027* (2013.01); *H01M 2004/028* (2013.01); *H01M 4/131* (2013.01)

(58) Field of Classification Search
CPC ........ H01M 4/623; H01M 4/62; H01M 4/587; H01M 4/0404; H01M 4/0409; H01M 4/1391; H01M 4/524; H01M 4/622; H01M 4/131; H01M 10/0525; H01M 10/0569; H01M 50/46
See application file for complete search history.

(56) References Cited

U.S. PATENT DOCUMENTS

| | | | |
|---|---|---|---|
| 2002/0018930 A1 | 2/2002 | Hamano et al. | |
| 2005/0130042 A1 | 6/2005 | Hulquan | H01M 4/366 |
| | | | 429/223 |
| 2009/0061313 A1 | 3/2009 | Tadano | H01M 4/139 |
| | | | 429/217 |
| 2009/0111012 A1* | 4/2009 | Shibuya | H01M 10/0565 |
| | | | 429/163 |
| 2011/0159370 A1 | 6/2011 | Inaba | H01M 4/386 |
| | | | 429/231.1 |
| 2011/0206977 A1 | 8/2011 | Ikeda | H01M 4/13 |
| | | | 429/163 |
| 2011/0223492 A1 | 9/2011 | Sakitani | H01M 10/056 |
| | | | 429/339 |
| 2012/0034534 A1 | 2/2012 | Palanichamy | H01M 10/0569 |
| | | | 429/324 |
| 2012/0064415 A1* | 3/2012 | Satow | H01M 10/0569 |
| | | | 429/217 |
| 2013/0157130 A1 | 6/2013 | Tamaki | H01M 4/62 |
| | | | 429/211 |
| 2014/0045031 A1 | 2/2014 | Matsumoto et al. | |
| 2014/0287295 A1* | 9/2014 | Honda | B32B 5/022 |
| | | | 429/144 |
| 2014/0287296 A1 | 9/2014 | Honda | B32B 5/024 |
| | | | 429/144 |
| 2015/0140401 A1* | 5/2015 | Minagata | H01G 11/12 |
| | | | 429/246 |
| 2015/0243989 A1* | 8/2015 | Yamada | H01M 4/587 |
| | | | 427/113 |
| 2015/0303480 A1* | 10/2015 | Hanazaki | H01M 4/0404 |
| | | | 427/122 |
| 2016/0293940 A1 | 10/2016 | Kinoshita | H01M 4/13 |
| 2018/0114966 A1 | 4/2018 | Yasuda | H01M 10/4235 |

FOREIGN PATENT DOCUMENTS

| | | | |
|---|---|---|---|
| CN | 101425608 A | 5/2009 | |
| CN | 102132443 A | 7/2011 | |
| CN | 103155216 A | 6/2013 | |
| JP | H10-172537 A | 6/1998 | |
| JP | H10-172806 A | 6/1998 | |
| JP | A-H11-288741 | 10/1999 | |
| JP | A-2000-348776 | 12/2000 | |
| JP | 2002298928 A | * | 10/2002 |
| JP | A-2007-188888 | 7/2007 | |
| JP | A-2008-159410 | 7/2008 | |
| JP | A-2009-043641 | 2/2009 | |
| JP | 2009-135070 A | 6/2009 | |
| JP | A-2008-301765 | 12/2009 | |
| JP | B-5454295 | 3/2014 | |
| JP | A-2014-203676 | 10/2014 | |
| JP | 2015133217 A | 7/2015 | |
| WO | 2013/051079 A1 | 4/2013 | |

OTHER PUBLICATIONS

Chinese Office Action for CN Application No. 201780028890.9 mailed on Feb. 2, 2021 with English Translation.
Japanese Office Action for JP Application No. 2018-519226 mailed on Apr. 27, 2021 with English Translation.
Chinese Office Action for CN Application No. 201780028890.9 mailed on Aug. 2, 2021 with English Translation.
Chinese Office Communication for CN Application No. 201780028890.9 mailed on Feb. 9, 2022 with English Translation.
English Translation of JP-2002298928A, Evaluation method for electrode body . . . Oct. 11, 2002, NGK Insulators LTD (Year: 2002).
English Translation of JP-2015133217- Nonaqueous electrolyte secondary battery, Toyota, Jul. 23, 2015 (Year: 2015).

* cited by examiner

ELECTRODE FOR BATTERY, BATTERY HAVING ELECTRODE AND METHOD FOR MANUFACTURING ELECTRODE AND BATTERY HAVING ELECTRODE

CROSS-REFERENCE TO RELATED PATENT APPLICATIONS

This application is a Continuation of U.S. application Ser. No. 16/086,188 filed Sep. 18, 2018, which is a National Stage Entry of International Application No. PCT/JP2017/018650, filed May 18, 2017, which claims priority from Japanese Patent Application No. JP 2016-104345, filed May 25, 2016. The entire contents of the above referenced applications are expressly incorporated herein by reference.

TECHNICAL FIELD

The present invention relates to an electrode for a battery and a method for manufacturing the electrode, and in particular, to an electrode having an insulating layer on an active material layer and the like.

BACKGROUND ART

Secondary batteries are widely used as power sources for portable electronic devices such as smart phones, tablet computers, notebook computers, digital cameras, and the like. In addition, secondary batteries have been expanding their application as power sources for electric vehicles and household power supplies. Among them, since lithium ion secondary batteries are high in energy density and light in weight, they are indispensable energy storage devices for current life.

A conventional battery including a secondary battery has a structure in which a positive electrode and a negative electrode, which are electrodes, are opposed to each other with a separator interposed therebetween. The positive electrode and the negative electrode each have a sheet-like current collector and active material layers formed on both sides of the current collector. The separator serves to prevent a short circuit between the positive electrode and the negative electrode and to effectively move ions between the positive electrode and the negative electrode.

Conventionally, a polyolefin system microporous separator made of polypropylene or polyethylene material is mainly used as the separator. However, the melting points of polypropylene and polyethylene materials are generally 110° C. to 160° C. Therefore, when a polyolefin system separator is used for a battery with a high energy density, the separator melts at a high temperature of the battery, and a short circuit may occur between the electrodes in a large area.

Therefore, in order to improve the safety of the battery, it has been proposed to form an insulating layer which is a substitute for a separator in at least one of the positive electrode and the negative electrode. For example, Patent Literature 1 (Japanese Patent Laid-Open No. 2009-43641) discloses a negative electrode for a battery in which a negative electrode active material layer is formed on a surface of a negative electrode current collector, and a porous layer is formed on the surface of the negative electrode active material layer. Similarly, Patent Literature 2 (Japanese Patent Laid-Open No. 2009-301765) discloses an electrode in which a porous protective film is provided on a surface of an active material layer formed on a current collector. Patent Literature 3 (Japanese Patent No. 5454295) discloses a method in which two or more paste layers are overlaid on a core material (current collector) of a positive electrode or a negative electrode, and then the paste layer is dried to form a positive electrode plate or a negative electrode.

Generally, the active material layer is formed on the current collector as follows. First, a long current collector foil wound on a roll is prepared as a current collector and a slurry for forming an active material layer is prepared. The slurry for forming the active material layer is a slurry obtained by dispersing fine particles of an active material and a binder in a solvent. Then, while feeding the current collector foil from the roll, the slurry for forming the active material layer is applied to the surface of the current collector foil by means of a die coater or the like. After applying the slurry for forming active material layer, the slurry for forming active material layer is dried and compression-molded, whereby the active material layer is formed on the surface of the current collector.

The insulating layer on the surface of the active material layer can be formed in the same manner as the formation of the active material layer. That is, a slurry for forming an insulating layer in which fine particles of an insulating material and a binder are dispersed in a solvent is applied to the surface of the active material layer, and then the slurry is dried and compression-molded.

Thereby, the insulating layer is formed on the surface of the active material layer.

CITATION LIST

Patent Literature

Patent Literature 1: Japanese Patent Laid-Open No. 2009-43641
Patent Literature 2: Japanese Patent Laid-Open No. 2009-301765
Patent Literature 3: Japanese Patent No. 5454295

SUMMARY OF INVENTION

Technical Problem

However, in the above-described conventional electrode, when the temperature of the battery becomes high and the separator shrinks in the in-plane direction, there was a possibility that the insulating layer was dragged by the separator and peeled off from the active material layer to expose the active material layer. When the active material layer is exposed, it causes a short circuit between the positive electrode and the negative electrode. In addition, at high temperature, shrinkage force in the in-plane direction also acts on the active material layer itself and the insulating layer itself. Therefore, when the adhesion between the current collector and the active material layer is weak, the active material layer separates from the surface of the current collector and shrinks, and a part of the surface of the current collector is exposed. Alternatively, when the adhesion between the active material layer and the insulating layer is weaker than the adhesion between the active material layer and the current collector, although the adhesion between the active material layer and the current collector is maintained and shrinkage of the active material layer does not occur, there is a possibility that the insulating layer separates from the surface of the active material layer and shrinks, and a part of the active material layer is exposed.

An object of the present invention is to provide an electrode having an active material layer and an insulating layer on a current collector and a method for manufacturing the electrode in which the electrode is capable of suppressing the occurrence of a short circuit even when the electrode is assembled as a battery and used to reach a high temperature.

Solution to Problem

According to one aspect of the present invention, an electrode for a battery comprising:
a current collector,
an active material layer formed on at least one surface of the current collector,
an insulating layer formed on a surface of the active material layer, and
wherein peeling occurs between the current collector and the active material layer and a peeling strength thereof is 10 mN/mm or more when a 90° peeling test is carried out at a peeling rate of 100 mm/min is provided.

According to the other aspect of the present invention, a battery comprising:
at least one positive electrode,
at least one negative electrode disposed to face the positive electrode, and
wherein at least one of the positive electrode and the negative electrode includes a current collector, an active material layer formed on at least one surface of the current collector, and an insulating layer formed on a surface of the active material layer, and peeling occurs between the current collector and the active material layer and a peeling strength thereof is 10 mN/mm or more when a 90° peeling test is carried out at a peeling rate of 100 mm/min is provided.

The present invention further provides a method for manufacturing an electrode for a battery, the method comprising;
forming an active material layer on at least one surface of a current collector,
forming an insulating layer such that the insulating layer is finally laminated on a surface of the active material layer, and
wherein at least one of a material of the active material layer, a formation condition of the active material layer, a material of the insulating layer and a formation condition of the insulating layer is determined such that peeling occurs between the current collector and the active material layer and a peeling strength thereof is 10 mN/mm or more when a 90° peeling test is carried out at a peeling rate of 100 mm/min.

Definition of Terms Used in the Present Invention

"90° peeling test" refers to a test of obtaining peeling strength from the maximum load applied to a sample before the sample peels off when the sample prepared from an electrode having an active material layer and an insulating layer formed on the surface of a current collector was fixed on the surface of a sample table, and the sample was peeled from the sample table at a peeling rate of 100 mm/min while holding one end portion of the fixed sample and keeping the peel angle at 90°. In the present invention, the "90° peeling test" is carried out under an ambient temperature environment (15° C. to 25° C.). As the sample, an electrode cut into a width of 20 mm and a length of 100 mm is used. For fixing the sample to the sample table, the surface on which the active material layer and the insulating layer are formed is fixed to the sample table. At this time, only the portion of the sample from the one end to 80 mm in the longitudinal direction is fixed, and a portion of the sample not fixed is set as a grip margin by a chuck or the like at the time of peeling the sample. The method of fixing the sample to the sample table is not particularly limited as long as the sample can be fixed so that the insulation layer does not peel from the sample table when the sample is peeled off. For fixing the sample, for example, double-sided tape can be used.

"Peeling strength" is expressed as a value obtained by dividing the maximum load measured in the "90° peeling test" by the width of the sample of 20 mm and converting it into force per 1 mm of the sample width.

Advantageous Effects of Invention

According to the present invention, a short circuit between the positive electrode and the negative electrode at high temperature can be effectively suppressed.

BRIEF DESCRIPTION OF DRAWINGS

FIG. 6 is a schematic view of one embodiment of an electrode manufacturing apparatus according to the present invention.

DESCRIPTION OF EMBODIMENTS

Figure 1:
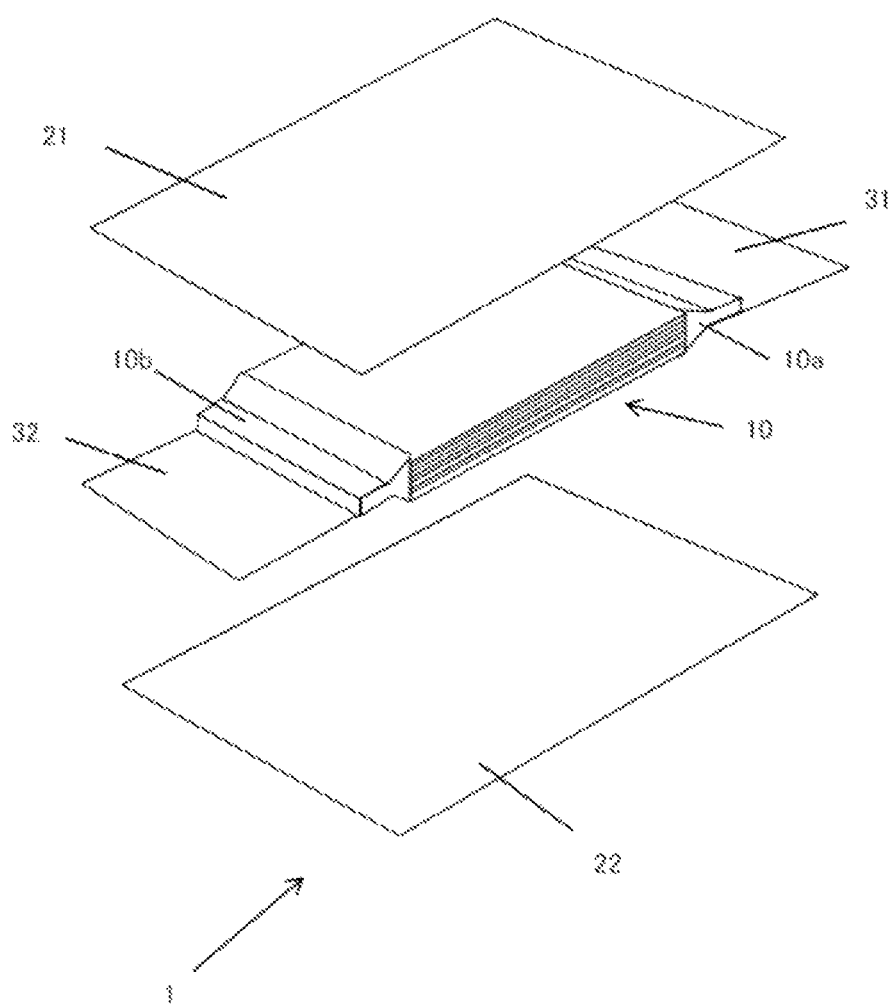
FIG. 1 is an exploded perspective view of a battery according to one embodiment of the present invention.

Referring to FIG. 1, an exploded perspective view of a battery 1 according to one embodiment of the present invention is shown, which comprises an electrode assembly 10 and a casing enclosing the electrode assembly 10 together with an electrolyte. The casing has casing members 21, 22 that enclose the electrode assembly 10 from both sides in the thickness direction thereof and seal outer circumferential portions thereof to thereby seal the electrode assembly 10. A positive electrode terminal 31 and a negative electrode terminal 32 are respectively connected to the electrode assembly 10 with protruding part of them from the casing.

Figure 2:
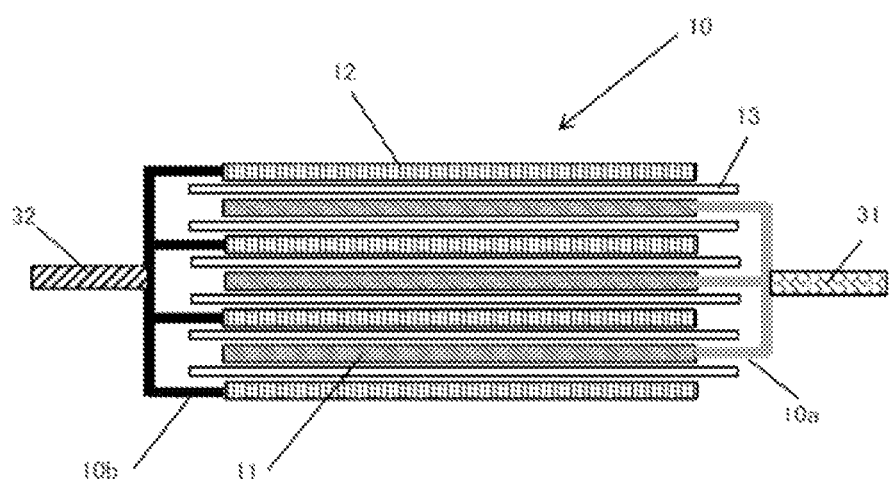
FIG. 2 is a schematic cross-sectional view of an electrode assembly shown in FIG. 1.

As shown in FIG. 2, the electrode assembly 10 has a configuration in which a plurality of positive electrodes 11 and a plurality of negative electrodes 12 are disposed so as to be alternately positioned. Between the positive electrode 11 and the negative electrode 12, a separator 13 for preventing short-circuiting between the positive electrode 11 and the negative electrode 12 while securing ionic conduction between the positive electrode 11 and the negative electrode 12 is arranged as necessary according to the structure of the positive electrode 11 and the negative electrode 12 described below.

Figure 3:
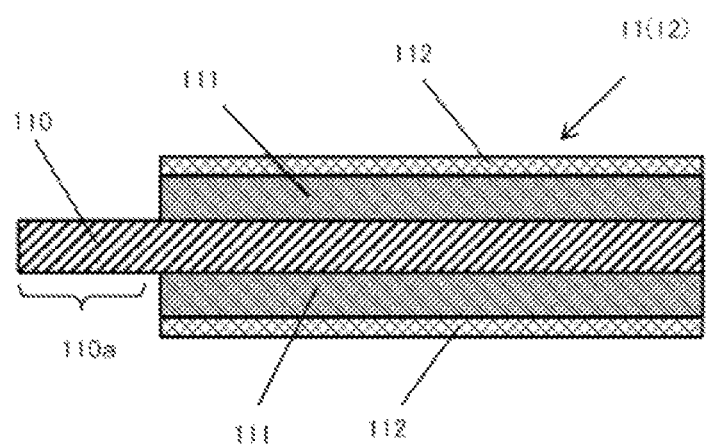
FIG. 3 is a schematic cross-sectional view for explaining the structures of the positive electrode and the negative electrode shown in FIG. 2.

Structures of the positive electrode 11 and the negative electrode 12 will be described with further reference to FIG. 3. In the structure shown in FIG. 3, the positive electrode 11 and the negative electrode 12 are not particularly distinguished, but the structure is applicable to both the positive electrode 11 and the negative electrode 12. The positive electrode 11 and the negative electrode 12 (collectively referred to as "electrode" in a case where these are not distinguished) include a current collector 110 which can be formed of a metal foil, an active material layer 111 formed on one or both surfaces of the current collector 110. The active material layer 111 is preferably formed in a rectangular shape in plan view, and the current collector 110 has a shape having an extended portion 110a extending from a region where the active material layer 111 is formed.

The extended portion 110a of the positive electrode 11 and the extended portion 110a of the negative electrode 12 are formed at positions not overlapping each other in a state where the positive electrode 11 and the negative electrode 12 are laminated. However, the extension portions 110a of the positive electrodes 11 are positioned to overlap with each other, and the extension portions 110a of the negative electrodes 12 are also similar to each other. With such arrangement of the extended portions 110a, in each of the plurality of positive electrodes 11, the respective extended portions 110a are collected and welded together to form a positive electrode tab 10a. Likewise, in the plurality of negative electrodes 12, the respective extended portions 110a are collected and welded together to form a negative electrode tab 10b. A positive electrode terminal 31 is electrically connected to the positive electrode tab 10a and a negative electrode terminal 32 is electrically connected to the negative electrode tab 10b.

At least one of the positive electrode 11 and the negative electrode 12 further includes an insulating layer 112 formed on the active material layer 111. The insulating layer 112 is formed in a region where the active material layer 111 is not exposed in plan view. In the case where the active material layer 111 is formed on both surfaces of the current collector 110, the insulating layer 112 may be formed on both of the active materials 111, or may be formed only on one of the active materials 111.

What is important here is that when a 90° peeling test is carried out with a sample cut out with an electrode having the active material layer 111 and the insulating layer 112 on the current collector 110 with a width of 20 mm at a peeling rate of 100 mm/min, peeling occurs between the current collector 110 and the active material layer 111, and its peeling strength is 10 mN/mm or more. Peeling between the current collector 110 and the active material layer 111 during the 90° peeling test means that the peeling strength between the active material layer 111 and the insulating layer 112 is higher than the peeling strength between the current collector 110 and the active material layer 111. By specifying the peeling strength between the current collector 110, the active material layer 111 and the insulating layer 112 in this manner, even when the battery becomes high in temperature when used as a battery, the positive electrode and the negative electrode can be effectively suppressed.

Figure 4A:
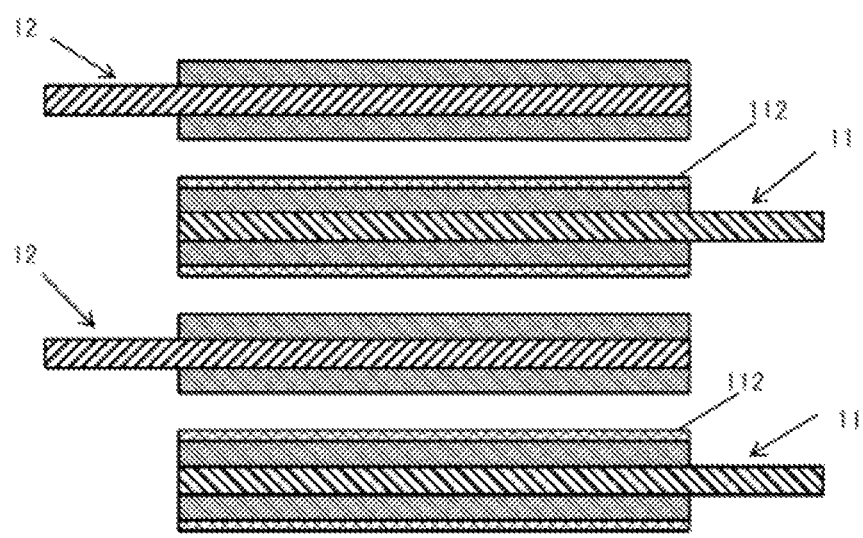
FIG. 4A is a cross-sectional view showing an example of arrangement of the positive electrode and the negative electrode in the electrode assembly.
Figure 4B:
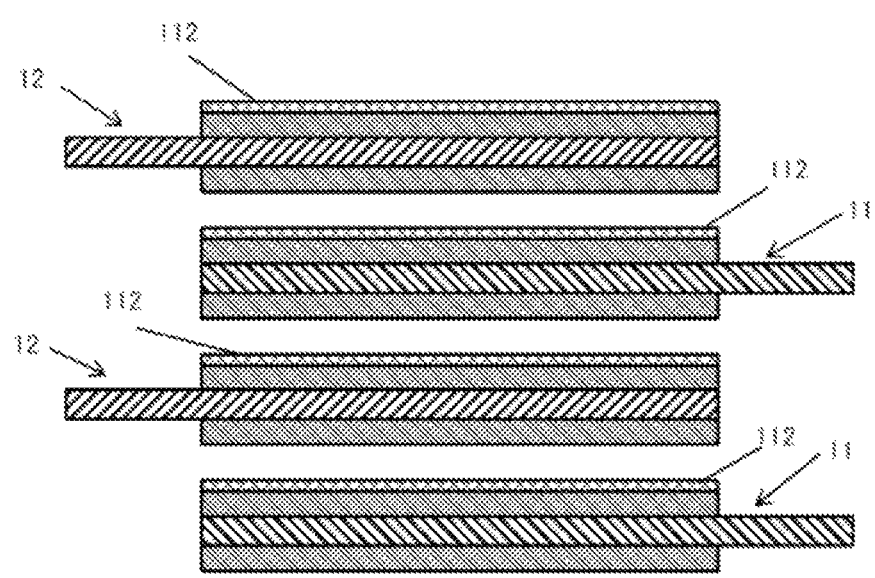
FIG. 4B is a cross-sectional view showing another example of arrangement of the positive electrode and the negative electrode in the electrode assembly.
Figure 4C:
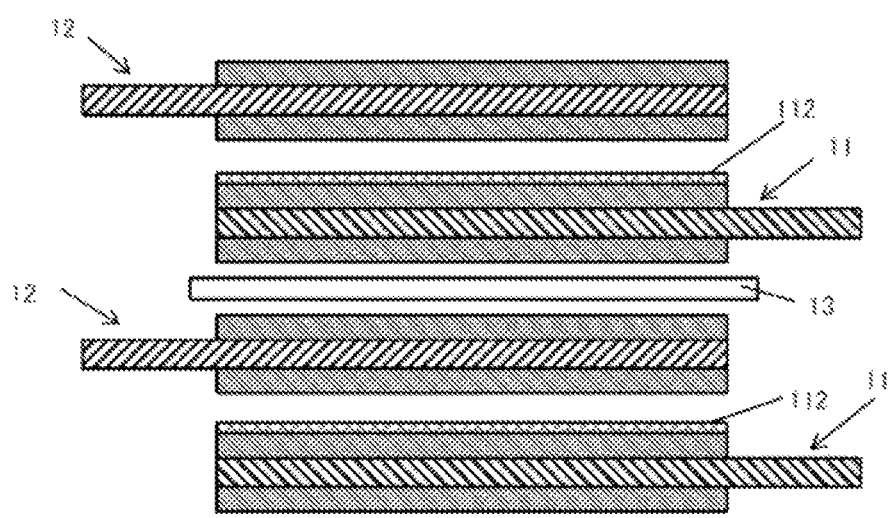
FIG. 4C is a cross-sectional view showing still another example of arrangement of the positive electrode and the negative electrode in the electrode assembly.

Some examples of the arrangement of the positive electrode 11 and the negative electrode 12 having such a structure are shown in FIGS. 4A to 4C. In the arrangement shown in FIG. 4A, the positive electrode 11 having the insulating layer 112 on both sides and the negative electrode 12 not having the insulating layer are alternately laminated. In the arrangement shown in FIG. 4B, the positive electrode 11 and the negative electrode 12 having the insulating layer 112 on only one side are alternately laminated in such a manner that the respective insulating layers 112 do not face each other. In the structures shown in FIGS. 4A and 4B, since the insulating layer 112 exists between the positive electrode 11 and the negative electrode 12, the separator 13 (see FIG. 2) can be omitted.

On the other hand, in the arrangement shown in FIG. 4C, the positive electrode 11 having the insulating layer 112 on only one side and the negative electrode 12 not having the insulating layer are alternately stacked. In this case, the separator 13 is required between the positive electrode 11 and the negative electrode 12 opposed to the surface not having the insulating layer 112. However, since the separator 13 can be omitted between the positive electrode 11 and the negative electrode 12 opposed to the surface having the insulating layer 112, the number of the separators 13 can be reduced.

The structure and arrangement of the positive electrode 11 and the negative electrode 12 are not limited to the above examples and various modifications are possible as long as the insulating layer 112 is provided on at least one surface of at least one of the positive electrode 11 and the negative electrode 12. For example, in the structures shown in FIGS. 4A to 4C, the relationship between the positive electrode 11 and the negative electrode 12 can be reversed.

Since the electrode assembly 10 having a planar laminated structure as illustrated has no portion having a small radius of curvature (a region close to a winding core of a winding structure), the electrode assembly 10 has an advantage that it is less susceptible to the volume change of the electrode due to charging and discharging as compared with the electrode assembly having a wound structure. That is, the electrode assembly having a planar laminated structure is effective for an electrode assembly using an active material that is liable to cause volume expansion.

Figure 5:
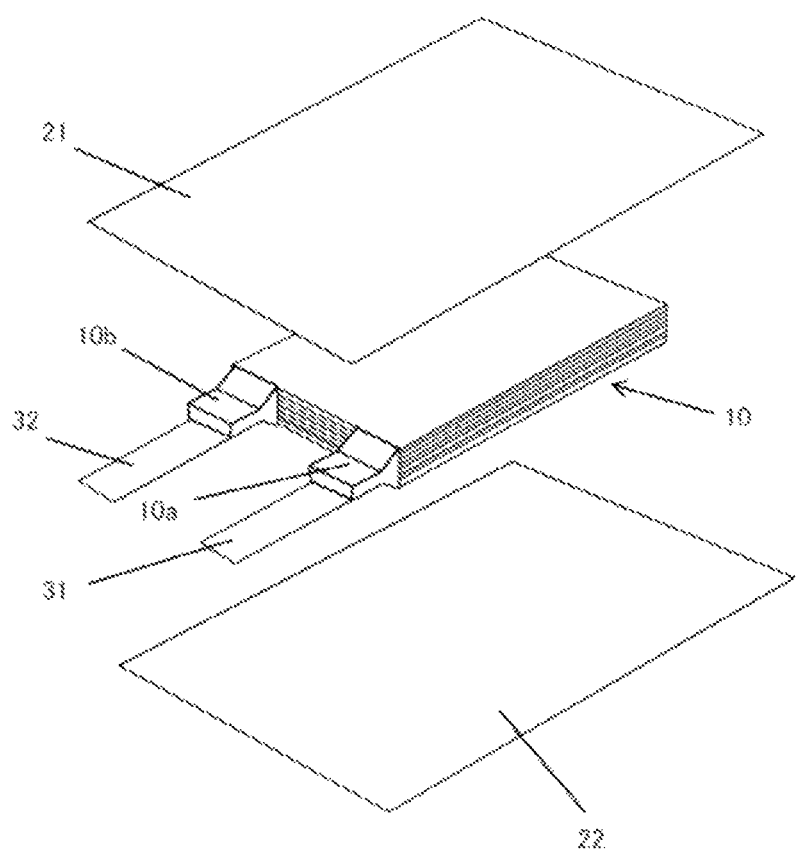

In the embodiment shown in FIGS. 1 and 2, the positive electrode terminal 31 and the negative electrode terminal 32 are drawn out in opposite directions, but the directions in which the positive electrode terminal 31 and the negative electrode terminal 32 are drawn out may be arbitrary. For example, as shown in FIG. 5, the positive electrode terminal 31 and the negative electrode terminal 32 may be drawn out from the same side of the electrode assembly 10. Although not shown, the positive electrode terminal 31 and the negative electrode terminal 32 may also be drawn out from two adjacent sides of the electrode assembly 10. In both of the above case, the positive electrode tab 10a and the negative electrode tab 10b can be formed at positions corresponding to the direction in which the positive electrode terminal 31 and the negative electrode terminal 32 are drawn out.

Furthermore, in the illustrated embodiment, the electrode assembly 10 having a laminated structure having a plurality of positive electrodes 11 and a plurality of negative electrodes 12 is shown. However, the electrode assembly having the winding structure may have one positive electrode 11 and one negative electrode 12.

Hereinafter, elements constituting the electrode assembly 10 and the electrolytic solution will be described in detail. In the following description, although not particularly limited, elements in the lithium ion secondary battery will be described.

[1] Negative Electrode

The negative electrode has a structure in which, for example, a negative electrode active material is adhered to a negative electrode current collector by a negative electrode binder, and the negative electrode active material is laminated on the negative electrode current collector as a negative electrode active material layer. Any material capable of absorbing and desorbing lithium ions with charge and discharge can be used as the negative electrode active material in the present embodiment as long as the effect of the present invention is not significantly impaired. Normally, as in the case of the positive electrode, the negative electrode is also configured by providing the negative electrode active material layer on the current collector. Similarly to the positive electrode, the negative electrode may also have other layers as appropriate.

The negative electrode active material is not particularly limited as long as it is a material capable of absorbing and desorbing lithium ions, and a known negative electrode active material can be arbitrarily used. For example, it is preferable to use carbonaceous materials such as coke, acetylene black, mesophase microbead, graphite and the like; lithium metal; lithium alloy such as lithium-silicon, lithium-tin; lithium titanate and the like as the negative electrode active material. Among these, carbonaceous materials are most preferably used from the viewpoint of good cycle characteristics and safety and further excellent continuous charge characteristics. One negative electrode active material may be used alone, or two or more negative electrode active materials may be used in combination in any combination and ratio.

Furthermore, the particle diameter of the negative electrode active material is arbitrary as long as the effect of the present invention is not significantly impaired. However, in terms of excellent battery characteristics such as initial efficiency, rate characteristics, cycle characteristics, etc., the particle diameter is usually 1 µm or more, preferably 15 µm or more, and usually about 50 µm or less, preferably about 30 µm or less. Furthermore, for example, it can be also used as the carbonaceous material such as a material obtained by coating the carbonaceous material with an organic substance such as pitch or the like and then calcining the carbonaceous material, or a material obtained by forming amorphous carbon on the surface using the CVD method or the like. Examples of the organic substances used for coating include coal tar pitch from soft pitch to hard pitch; coal heavy oil such as dry distilled liquefied oil; straight run heavy oil such as atmospheric residual oil and vacuum residual oil, crude oil; petroleum heavy oil such as decomposed heavy oil (for example, ethylene heavy end) produced as a by-product upon thermal decomposition of crude oil, naphtha and the like. A residue obtained by distilling these heavy oil at 200 to 400° C. and then pulverized to a size of 1 to 100 µm can also be used as the organic substance. In addition, vinyl chloride resin, phenol resin, imide resin and the like can also be used as the organic substance.

In one embodiment of the present invention, the negative electrode includes a metal and/or a metal oxide and carbon as the negative electrode active material. Examples of the metal include Li, Al, Si, Pb, Sn, In, Bi, Ag, Ba, Ca, Hg, Pd, Pt, Te, Zn, La, and alloys of two or more of these. These metals or alloys may be used as a mixture of two or more. In addition, these metals or alloys may contain one or more non-metall elements.

Examples of the metal oxide include silicon oxide, aluminum oxide, tin oxide, indium oxide, zinc oxide, lithium oxide, and composites of these. In the present embodiment, tin oxide or silicon oxide is preferably contained as the negative electrode active material, and silicon oxide is more preferably contained. This is because silicon oxide is relatively stable and hardly causes reaction with other compounds. Also, for example, 0.1 to 5 mass % of one or more elements selected from nitrogen, boron and sulfur can be added to the metal oxide. In this way, the electrical conductivity of the metal oxide can be improved. Also, the electrical conductivity can be similarly improved by coating the metal or the metal oxide with an electroconductive material such as carbon by vapor deposition or the like.

Examples of the carbon include graphite, amorphous carbon, diamond-like carbon, carbon nanotube, and composites of these. Highly crystalline graphite has high electrical conductivity and is excellent in adhesiveness with respect to a negative electrode current collector made of a metal such as copper and voltage flatness. On the other hand, since amorphous carbon having a low crystallinity has a relatively small volume expansion, it has a high effect of alleviating the volume expansion of the entire negative electrode, and deterioration due to nonuniformity such as crystal grain boundaries and defects hardly occurs.

The metal and the metal oxide have the feature that the capacity of accepting lithium is much larger than that of carbon. Therefore, the energy density of the battery can be improved by using a large amount of the metal and the metal oxide as the negative electrode active material. In order to achieve high energy density, it is preferable that the content ratio of the metal and/or the metal oxide in the negative electrode active material is high. A larger amount of the metal and/or the metal oxide is preferable, since it increases the capacity of the negative electrode as a whole. The metal and/or the metal oxide is preferably contained in the negative electrode in an amount of 0.01% by mass or more of the negative electrode active material, more preferably 0.1% by mass or more, and further preferably 1% by mass or more. However, the metal and/or the metal oxide has large volume change upon absorbing and desorbing of lithium as compared with carbon, and electrical junction may be lost. Therefore, the amount of the metal and/or the metal oxide in the negative active material is 99% by mass or less, preferably 90% or less, more preferably 80 mass % or less. As described above, the negative electrode active material is a material capable of reversibly absorbing and desorbing lithium ions with charge and discharge in the negative electrode, and does not include other binder and the like.

For example, the negative electrode active material layer may be formed into a sheet electrode by roll-forming the above-described negative electrode active material, or may be formed into a pellet electrode by compression molding. However, usually, as in the case of the positive electrode active material layer, the negative electrode active material layer can be formed by applying and drying an application liquid on a current collector, where the application liquid may be obtained by slurrying the above-described negative electrode active material, a binder, and various auxiliaries contained as necessary with a solvent.

The negative electrode binder is not particularly limited, and examples thereof include polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, acrylic, polyimide, polyamide imide and the like. In addition to the above, styrene butadiene rubber (SBR) and the like can be included. When an aqueous binder such as an SBR emulsion is used, a thickener such as carboxymethyl cellulose (CMC) can also be used. The amount of the negative electrode binder to be used is preferably 0.5 to 20 parts by mass relative to 100 parts by mass of the negative electrode active material from the viewpoint of a trade-off between "sufficient binding strength" and "high energy". The negative electrode binders may be mixed and used.

As the material of the negative electrode current collector, a known material can be arbitrarily used, and for example, a metal material such as copper, nickel, stainless steel, aluminum, chromium, silver and an alloy thereof is preferably used from the viewpoint of electrochemical stability. Among them, copper is particularly preferable from the viewpoint of ease of processing and cost. It is also preferable that the negative electrode current collector is also subjected to surface roughening treatment in advance. Further, the shape of the current collector is also arbitrary, and examples thereof include a foil shape, a flat plate shape and a mesh shape. A perforated type current collector such as an expanded metal or a punching metal can also be used.

The negative electrode can be produced, for example, by forming a negative electrode active material layer containing a negative electrode active material and a negative electrode binder on a negative electrode current collector. Examples of a method for forming the negative electrode active material layer include a doctor blade method, a die coater method, a CVD method, a sputtering method, and the like. After forming the negative electrode active material layer in advance, a thin film of aluminum, nickel or an alloy thereof may be formed by a method such as vapor deposition, sputtering or the like to obtain a negative electrode current collector.

An electroconductive auxiliary material may be added to a coating layer containing the negative electrode active material for the purpose of lowering the impedance. Examples of the electroconductive auxiliary material include flaky, sooty, fibrous carbonaceous microparticles and the like such as graphite, carbon black, acetylene black, vapor grown carbon fiber (for example, VGCF (registered trademark) manufactured by Showa Denko K.K.), and the like.

[2] Positive Electrode

The positive electrode refers to an electrode on the high potential side in a battery. As an example, the positive electrode includes a positive electrode active material capable of reversibly absorbing and desorbing lithium ions with charge and discharge, and has a structure in which a positive electrode active material is laminated on a current collector as a positive electrode active material layer integrated with a positive electrode binder. In one embodiment of the present invention, the positive electrode has a charge capacity per unit area of 3 mAh/cm$^2$ or more, preferably 3.5 mAh/cm$^2$ or more. From the viewpoint of safety and the like, the charge capacity per unit area of the positive electrode is preferably 15 mAh/cm$^2$ or less. Here, the charge capacity per unit area is calculated from the theoretical capacity of the active material. That is, the charge capacity of the positive electrode per unit area is calculated by (theoretical capacity of the positive electrode active material used for the positive electrode)/(area of the positive electrode). Note that the area of the positive electrode refers to the area of one surface, not both surfaces of the positive electrode.

The positive electrode active material in the present embodiment is not particularly limited as long as it is a material capable of absorbing and desorbing lithium, and can be selected from several viewpoints. A high-capacity compound is preferably contained from the viewpoint of high energy density. Examples of the high-capacity compound include nickel lithate (LiNiO$_2$) and a lithium nickel composite oxide obtained by partially replacing Ni of nickel lithate with another metal element, and a layered lithium nickel composite oxide represented by formula (A) below is preferable.

$$Li_yNi_{(1-x)}M_xO_2 \qquad (A)$$

(provided that 0≤x≤1, 0≤y≤1.2, and M is at least one element selected from the group consisting of Co, Al, Mn, Fe, Ti, and B.)

From the viewpoint of high capacity, the Ni content is preferably high, or that is to say, x is less than 0.5 in formula (A), and more preferably 0.4 or less. Examples of such compounds include $Li_\alpha Ni_\beta Co_\gamma Mn_\delta O_2$ (0≤α≤1.2, preferably 1≤α≤1.2, α+γ+δ=1, β≥0.7, and γ≤0.2) and $Li_\alpha Ni_\beta Co_\gamma Al_\delta O_2$ (0≤α≤1.2 preferably 1≤α≤1.2, β+γ+δ=1, β≥0.6 preferably β≥0.7, γ≤0.2), and, in particular, $LiNi_\beta Co_\gamma Mn_\delta O_2$ (0.75≤β≤0.85, 0.05≤γ≤0.15, 0.10≤δ≤0.20). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ can be preferably used.

From the viewpoint of heat stability, it is also preferable that the Ni content does not exceed 0.5, or that is to say, x is 0.5 or more in formula (A). It is also preferable that a certain transition metal does not account for more than half. Examples of such compounds include $Li_\alpha Ni_\beta Co_\gamma Mn_\delta O_2$ (0≤α≤1.2 preferably 1≤α≤1.2, β+γ+δ=1, 0.2≤β≤0.5, 0.1≤γ≤0.4, 0.1≤δ≤0.4). More specific examples include $LiNi_{0.4}Co_{0.3}Mn_{0.3}O_2$ (abbreviated as NCM433), $LiNi_{1/3}Co_{1/3}Mn_{1/3}O_2$, $LiNi_{0.8}Co_{0.2}Mn_{0.3}O_2$ (abbreviated as NCM523), and $LiNi_{0.8}Co_{0.3}Mn_{0.2}O_2$ (abbreviated as NCM532) (provided that these compounds include those in which the content of each transition metal is varied by about 10%).

Also, two or more compounds represented by formula (A) may be used as a mixture, and, for example, it is also preferable to use NCM532 or NCM523 with NCM433 in a range of 9:1 to 1:9 (2:1 as a typical example) as a mixture. Moreover, a battery having a high capacity and a high heat stability can be formed by mixing a material having a high Ni content (x is 0.4 or less) with a material having a Ni content not exceeding 0.5 (x is 0.5 or more, such as NCM433) in formula (A).

Other than the above positive electrode active materials, examples include lithium manganates having a layered structure or a spinel structure, such as $LiMnO_2$, $Li_xMn_2O_4$ (0<x<2), $Li_2MnO_3$, and $Li_xMn_{1.5}Ni_{0.8}O_4$ (0<x<2); $LiCoO_2$ and those obtained by partially replacing these transition metals with other metals; those having an excess of Li based on the stoichiometric compositions of these lithium transition metal oxides; and those having an olivine structure such as $LiFePO_4$. Moreover, materials obtained by partially replacing these metal oxides with Al, Fe, P, Ti, Si, Pb, Sn, In, Bi, Ag, Ba, Ca, Hg, Pd, Pt, Te, Zn, La, or the like can be used as well. One of the positive electrode active materials described above may be used singly, or two or more can be used in combination.

A positive electrode binder similar to the negative electrode binder can be used. Among them, polyvinylidene fluoride or polytetrafluoroethylene is preferable from the viewpoint of versatility and low cost, and polyvinylidene fluoride is more preferable. The amount of the positive electrode binder used is preferably 2 to 15 parts by mass relative to 100 parts by mass of the positive electrode active material from the viewpoint of a trade-off between "sufficient binding strength" and "high energy".

An electroconductive auxiliary material may be added to a coating layer containing the positive electrode active material for the purpose of lowering the impedance. Examples of the conductive auxiliary material include flaky, sooty, fibrous carbonaceous microparticles and the like such as graphite, carbon black, acetylene black, vapor grown carbon fiber (for example, VGCF manufactured by Showa Denko K.K.) and the like.

A positive electrode current collector similar to the negative electrode current collector can be used. In particular, as the positive electrode, a current collector using aluminum, an aluminum alloy, iron, nickel, chromium, molybdenum type stainless steel is preferable.

An electroconductive auxiliary material may be added to a positive electrode active material layer containing the positive electrode active material for the purpose of lowering the impedance. Examples of the conductive auxiliary material include carbonaceous microparticles such as graphite, carbon black and acetylene black.

[3] Insulating Layer
(Material and Manufacturing Method Etc.)

The insulating layer can be formed by applying a slurry composition for an insulating layer so as to cover a part of the active material layer of the positive electrode or the negative electrode and drying and removing a solvent. Although the insulating layer may be formed on only one side of the active material layer, there is an advantage that the warpage of the electrode can be reduced by forming the insulating layer on both side (in particular, as a symmetrical structure).

A slurry for the insulating layer is a slurry composition for forming a porous insulating layer. Therefore, the "insulating layer" can also be referred to as "porous insulating layer". The slurry for the insulating layer comprises non-conductive particles and a binder (or a binding agent) having a specific composition, and the non-conductive particles, the binder and optional components are uniformly dispersed as a solid content in a solvent.

It is desirable that the non-conductive particles stably exist in the use environment of the lithium ion secondary battery and are electrochemically stable. As the non-conductive particles, for example, various inorganic particles, organic particles and other particles can be used. Among them, inorganic oxide particles or organic particles are preferable, and in particular, from the viewpoint of high thermal stability of the particles, it is more preferable to use inorganic oxide particles. Metal ions in the particles sometimes form salts near the electrode, which may cause an increase in the internal resistance of the electrode and a decrease in cycle characteristics of the secondary battery. The other particles include particles to which conductivity is given by surface treatment of the surface of fine powder with a non-electrically conductive substance. The fine powder can be made from a conductive metal, compound and oxide such as carbon black, graphite, $SnO_2$, ITO and metal powder. Two or more of the above-mentioned particles may be used in combination as the non-conductive particles.

Examples of the inorganic particles include inorganic oxide particles such as aluminum oxide, silicon oxide, magnesium oxide, titanium oxide, $BaTiO_2$, ZrO, alumina-silica composite oxide; inorganic nitride particles such as aluminum nitride and boron nitride; covalent crystal particles such as silicone, diamond and the like; sparingly soluble ionic crystal particles such as barium sulfate, calcium fluoride, barium fluoride and the like; clay fine particles such as talc and montmorillonite. These particles may be subjected to element substitution, surface treatment, solid solution treatment, etc., if necessary, and may be used singly or in combination of two or more kinds. Among them, inorganic oxide particles are preferable from the viewpoints of stability in the electrolytic solution and potential stability.

The shape of the inorganic particles is not particularly limited, and may be spherical, needle-like, rod-like, spindle-shaped, plate-like, or the like. From the viewpoint of effectively preventing penetration of the needle-shaped object, the shape of the inorganic particle may be in the form of a plate.

By orienting the inorganic particles as described above, it is conceivable that the inorganic particles are arranged so as to overlap with each other on a part of the flat surface, and voids (through holes) from one surface to the other surface of the porous film are formed not in a straight but in a bent shape (that is, the curvature ratio is increased). This is presumed to prevent the lithium dendrite from penetrating the porous film and to better suppress the occurrence of a short circuit.

Examples of the plate-like inorganic particles preferably used include various commercially available products such as "SUNLOVELY" ($SiO_2$) manufactured by AGC Si-Tech Co., Ltd., pulverized product of "NST-B 1" ($TiO_2$) manufactured by Ishihara Sangyo Kaisha, Ltd., plate like barium sulfate "H series", "HL series" manufactured by Sakai Chemical Industry Co., Ltd., "Micron White" (Talc) manufactured by Hayashi Kasei Co., Ltd., "Benger" (bentonite) manufactured by Hayashi Kasei Co., Ltd., "BMM" and "BMT" (boehmite) manufactured by Kawaii Lime Industry Co., Ltd., "Serasur BMT-B" [alumina ($Al_2O_3$)] manufactured by Kawaii Lime Industry Co., Ltd., "Serath" (alumina) manufactured by Kinsei Matec Co., Ltd., "AKP series" (alumina) manufactured by Sumitomo Chemical Co., Ltd., and "Hikawa Mica Z-20" (sericite) manufactured by Hikawa Mining Co., Ltd. In addition, $SiO_2$, $Al_2O_3$, and ZrO can be produced by the method disclosed in Japanese Patent Laid-Open No. 2003-206475.

The average particle diameter of the inorganic particles is preferably in the range of 0.005 to 10 μm, more preferably 0.1 to 5 μm, particularly preferably 0.3 to 2 μm. When the average particle size of the inorganic particles is in the above range, the dispersion state of the porous film slurry is easily controlled, so that it is easy to manufacture a porous film having a uniform and uniform thickness. In addition, such average particle size provides the following advantages. The adhesion to the binder is improved, and even when the porous film is wound, it is possible to prevent the inorganic particles from peeling off, and as a result, sufficient safety can be achieved even if the porous film is thinned. Since it is possible to suppress an increase in the particle packing ratio in the porous film, it is possible to suppress a decrease in ion conductivity in the porous film. Furthermore, the porous membrane can be made thin.

The average particle size of the inorganic particles can be obtained by arbitrarily selecting 50 primary particles from an SEM (scanning electron microscope) image in an arbitrary field of view, carrying out image analysis, and obtaining the average value of circle equivalent diameters of each particle.

The particle diameter distribution (CV value) of the inorganic particles is preferably 0.5 to 40%, more preferably 0.5 to 30%, particularly preferably 0.5 to 20%. By setting the particle size distribution of the inorganic particles within the above range, a predetermined gap between the non-conductive particles is maintained, so that it is possible to suppress an increase in resistance due to the inhibition of movement of lithium. The particle size distribution (CV value) of the inorganic particles can be determined by observing the inorganic particles with an electron microscope, measuring the particle diameter of 200 or more particles, determining the average particle diameter and the standard deviation of the particle diameter, and calculating (Standard deviation of particle diameter)/(average particle diameter). The larger the CV value means the larger variation in particle diameter.

When the solvent contained in the slurry for insulating layer is a non-aqueous solvent, a polymer dispersed or dissolved in a non-aqueous solvent can be used as a binder. As the polymer dispersed or dissolved in the non-aqueous solvent, polyvinylidene fluoride (PVdF), polytetrafluoroethylene (PTFE), polyhexafluoropropylene (PHFP), polytrifluoroethylene chloride (PCTFE), polyperfluoroalkoxyfluoroethylene, polyimide, polyamideimide, and the like can be used as a binder, and it is not limited thereto.

In addition, a binder used for binding the active material layer can also be used.

When the solvent contained in the slurry for insulating layer is an aqueous solvent (a solution using water or a mixed solvent containing water as a main component as a dispersion medium of the binder), a polymer dispersed or dissolved in an aqueous solvent can be used as a binder. A polymer dispersed or dissolved in an aqueous solvent includes, for example, an acrylic resin. As the acrylic resin, it is preferably to use homopolymers obtained by polymerizing monomers such as acrylic acid, methacrylic acid, acrylamide, methacrylamide, 2-hydroxyethyl acrylate, 2-hydroxyethyl methacrylate, methyl methacrylate, ethylhexyl acrylate, butyl acrylate. The acrylic resin may be a copolymer obtained by polymerizing two or more of the above monomers.

Further, two or more of the homopolymer and the copolymer may be mixed. In addition to the above-mentioned acrylic resin, polyolefin resins such as styrene butadiene rubber (SBR) and polyethylene (PE), polytetrafluoroethylene (PTFE), and the like can be used. These polymers can be used singly or in combination of two or more kinds. Among them, it is preferable to use an acrylic resin. The form of the binder is not particularly limited, and particles in the form of particles (powder) may be used as they are, or those prepared in a solution state or an emulsion state may be used. Two or more kinds of binders may be used in different forms.

The insulating layer may contain a material other than the above-described inorganic filler and binder, if necessary. Examples of such material include various polymer materials that can function as a thickener for a slurry for the insulating layer, which will be described later. In particular, when an aqueous solvent is used, it is preferable to contain a polymer functioning as the thickener. As the polymer functioning as the thickener, carboxymethyl cellulose (CMC) or methyl cellulose (MC) is preferably used.

Although not particularly limited, the ratio of the inorganic filler to the entire insulating layer is suitably about 70 mass % or more (for example, 70 mass % to 99 mass %), preferably 80 mass % or more (for example, 80 mass % to 99 mass %), and particularly preferably about 90 mass % to 95 mass %.

The ratio of the binder in the insulating layer is suitably about 1 to 30 mass % or less, preferably 5 to 20 mass % or less. In the case of containing an insulating layer-forming component other than the inorganic filler and the binder, for example, a thickener, the content ratio of the thickener is preferably about 10 mass % or less, more preferably about 7 mass % or less. If the ratio of the binder is too small, strength (shape retentivity) of the insulating layer itself and adhesion to the active material layer are lowered, which may cause defects such as cracking and peeling. If the ratio of the binder is too large, gaps between the particles of the insulating layer become insufficient, and the ion permeability in the insulating layer may decrease in some cases.

In order to maintain ion conductivity, The porosity (void ratio) (the ratio of the pore volume to the apparent volume) of the insulating layer is preferably 20% or more, more preferably 30% or more. However, if the porosity is too high, falling off or cracking of the insulating layer due to friction or impact applied to the insulating layer occurs, the porosity is preferably 80% or less, more preferably 70% or less.

The porosity can be calculated from the ratio of the materials constituting the insulating layer, the true specific gravity and the coating thickness.

(Forming of Insulating Layer)

A method of forming the insulating layer will be described. As a material for forming the insulating layer, a paste type material (including slurry form or ink form, the same applies below) mixed and dispersed with an inorganic filler, a binder and a solvent can be used.

A solvent used for the insulating layer slurry includes water or a mixed solvent mainly containing water. As a solvent other than water constituting such a mixed solvent, one or more kinds of organic solvents (lower alcohols, lower ketones, etc.) which can be uniformly mixed with water can be appropriately selected and used. Alternatively, it may be an organic solvent such as N-methylpyrrolidone (NMP), pyrrolidone, methyl ethyl ketone, methyl isobutyl ketone, cyclohexanone, toluene, dimethylformamide, dimethylacetamide, or a combination of two or more thereof. The content of the solvent in the slurry for the insulating layer is not particularly limited, and it is preferably 40 to 90 mass %, particularly preferably about 50 to 70 mass %, of the entire coating material.

The operation of mixing the inorganic filler and the binder with the solvent can be carried out by using a suitable kneading machine such as a ball mill, a homodisper, Disper Mill (registered trademark), Clearmix (registered trademark), Filmix (registered trademark), an ultrasonic dispersing machine.

For the operation of applying the slurry for the insulating layer, conventional general coating means can be used without restricting. For example, a predetermined amount of the slurry for the insulating layer can be applied by coating in a uniform thickness by means of a suitable coating device (a gravure coater, a slit coater, a die coater, a comma coater, a dip coater, etc.).

Thereafter, the solvent in the slurry for the insulating layer may be removed by drying the coating material by means of a suitable drying means.

(Thickness)

The thickness of the insulating layer is preferably 1 µm or more and 30 µm or less, and more preferably 2 µm or more and 15 µm or less.

[4] Electrolyte

As the electrolytic solution, a non-aqueous electrolytic solution that is stable at the operating potential of the battery is preferable, but it is not particularly limited. Specific examples of the non-aqueous electrolytic solution include an aprotic organic solvent including cyclic carbonates such as propylene carbonate (PC), ethylene carbonate (EC), fluoroethylene carbonate (FEC), t-difluoroethylene carbonate (t-DFEC), butylene carbonate (BC), vinylene carbonate (VC), vinyl ethylene carbonate (VEC); chain carbonates such as allyl methyl carbonate (AMC), dimethyl carbonate (DMC), diethyl carbonate (DEC), ethyl methyl carbonate (EMC), dipropyl carbonate (DPC); propylene carbonate derivatives; aliphatic carboxylic acid esters such as methyl formate, methyl acetate, ethyl propionate and the like; cyclic esters such as γ-butyrolactone (GBL). The non-aqueous electrolytic solution may be used singly or in combination of two or more. Sulfur-containing cyclic compounds such as sulfolane, fluorinated sulfolane, propane sultone, propene sultone and the like can be used as the non-aqueous electrolytic solution.

Specific examples of supporting salts contained in the electrolytic solution include lithium salts such as $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$, $LiN(CF_3SO_2)_2$ and the like, but are not limited. As the supporting salt, one type may be used alone, or two kinds or more may be used in combination.

[5] Separator

When the battery has a separator, the separator is not particularly limited, and a porous film or a nonwoven fabric made of polypropylene, polyethylene, fluororesin, polyamide, polyimide, polyester, polyphenylene sulfide or the like can be used as the separator. In addition, those including inorganic materials such as silica, alumina, glass and the like adhered or joined to the porous firm or the nonwoven fabric used as a base material and the inorganic materials alone processed into a nonwoven fabric or a cloth can also be used as the separator. Furthermore, a laminate of the these can be used as the separator.

The present invention is not limited to the above described lithium ion secondary battery and can be applied to any battery. However, since the problem of heat often occurs in batteries with high capacity in many cases, the present invention is preferably applied to batteries with high capacity, particularly lithium ion secondary batteries.

Next, embodiments of method for manufacturing the electrode shown in FIG. 3 will be described. In the following description, the positive electrode 11 and the negative electrode 12 will be described as "electrodes" without particularly distinguishing from each other, but the positive electrode 11 and the negative electrode differ only in the materials, shapes, etc. to be used, and the following explanation will be made on the positive electrode 11 and the negative electrode 12.

The electrode has a structure in which the active material layer 111 and the insulating layer 112 are laminated in this order on the current collector 110 finally and the manufacturing method is not particularly limited as long as peeling occurs between the current collector 110 and the active material layer 111 and its peeling strength is 10 mN/mm or more when a 90° peeling test is carried out at a peeling rate of 100 mm/min. At least one of the materials of the active material layer 111, the formation condition of the active material layer 111, the materials of the insulating layer 112 and the formation condition of the insulating layer 112 can be determined so as to satisfy the above peeling conditions.

The active material layer 111 can be formed by applying an mixture for an active material layer prepared by dispersing an active material and a binder in a solvent to form a slurry and drying the applied mixture for the active material layer. After the mixture for the active material layer is dried, the method may further include the step of compression-molding the dried mixture for the active material layer. The insulating layer 12 can also be formed in the same process as the active material layer 111. That is, the insulating layer 112 can be formed by applying an mixture for an insulating layer prepared by dispersing an insulating material and a binder in a solvent to form a slurry, and drying the applied mixture for the insulating layer. After the mixture for the insulating layer is dried, the method may further include the step of compression molding the dried mixture for the insulating layer.

The process for forming the active material layer 111 and the process for forming the insulating layer 112 described above may be carried out separately or in appropriate combination. In the case where the process for forming the active material layer 111 and the process for forming the insulating layer 112 are separately carried out, the manufacturing method for the electrode includes (1) applying a mixture for an active material on a current collector 110, (2) drying the applied mixture for the active material, (3) forming an active material layer 111 by compression-molding the dried mixture for the active material mixture, (4) applying a mixture for an insulating layer on the formed active material layer 111, (5) drying the applied mixture for the insulating layer, and (6) forming an insulating layer 112 by compression-molding the dried mixture for the insulating layer. In this case, since the insulating layer 112 is formed after the active material layer 111 is formed, it is possible to easily manage the thickness of each layer and the like. The step of compression-molding the mixture for the active material layer and the step of compression molding the mixture for the insulating layer can be omitted.

When combining the process of forming the active material layer 111 and the process of forming the insulating layer 112, there are several examples of the combination. Two examples among them are described below.

(Combination Example A)

In Combination Example A, the process of manufacturing the electrode includes (A1) applying the mixture for the active material layer on the current collector 110, (A2) drying the applied mixture for the active material layer, (A3) applying a mixture for an insulating layer on the dried mixture for the active material layer, (A4) drying the applied mixture for the insulating layer, and (A5) compression-molding the dried mixture for the active material layer and the dried mixture for the insulating layer mixture simultaneously. In this case, only one step of compression-molding is required, and the manufacturing process is simplified correspondingly. The above step of compression-molding can be omitted.

(Combination Example B)

In the combination Example B, the process of manufacturing the electrode includes (B1) applying a mixture for an active material layer on the current collector 110, (B2) applying an mixture for an insulating layer on the applied mixture for the active material layer, (B3) drying the whole of the applied mixture for the active material layer and the applied mixture for the insulating layer simultaneously, and (B4) compression-molding the whole of the dried mixture for the active material layer and the mixture for the insulating layer simultaneously. In this case, since only one step of drying and one step of compression-molding are required, the manufacturing process is further simplified. The above step of compression-molding can be omitted.

Figure 6:
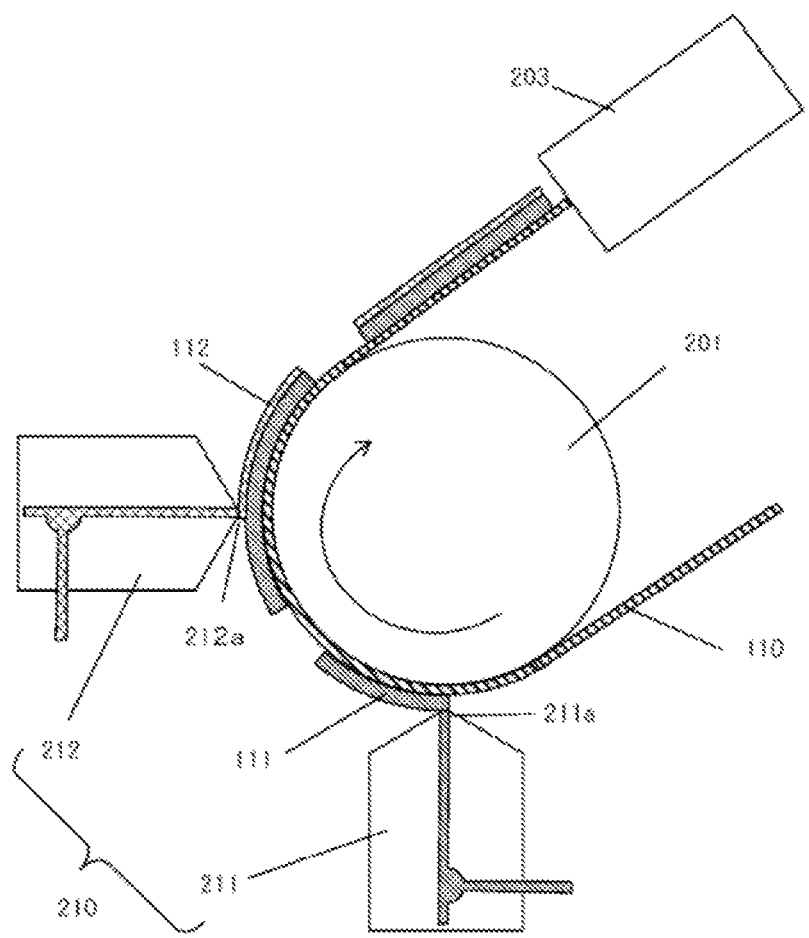
FIG. 6 is an exploded perspective view of a battery according to another embodiment of the present invention.

For manufacturing the electrode, for example, the manufacturing apparatus shown in FIG. 6 can be used. The manufacturing apparatus shown in FIG. 6 includes a backup roller 201, a die coater 210 and a drying machine 203.

The backup roller 201 rotates in a state in which the long current collector 110 is wound on the outer peripheral surface of the backup roller 201 whereby the current collector 110 is fed in the rotation direction of the backup roller 201 while the rear surface of the current collector 110 is supported. The die coater 210 has a first die head 211 and a second die head 212 which are spaced from each other in the radial direction and the circumferential direction of the backup roller 201 with respect to the outer circumferential surface of the backup roller 201.

The first die head 211 is for applying the active material layer 111 on the surface of the current collector 110 and is located on the upstream side of the second die head 212 with respect to the feed direction of the current collector 110. A discharge opening 211a having a width corresponding to the applying width of the active material layer 111 is opened at the tip of the first die head 211 facing the backup roller 201. The slurry for the active material layer is discharged from the discharger opening 211a. The slurry for the active material layer is prepared by dispersing particles of an active material and a binder (binding agent) in a solvent, and is supplied to the first die head 211.

The second die head 212 is for applying the insulating layer 112 on the surface of the active material layer 111 and is located on the downstream side of the first die head 211 with respect to the feed direction of the current collector 110. A discharge opening 212a having a width corresponding to the applying width of the insulating layer 112 is opened at the tip of the second die head 212 facing the backup roller 201. The slurry for the insulating layer is discharged from the discharge opening 212a. The slurry for the insulating layer is prepared by dispersing insulating particles and a binder (binding agent) in a solvent, and is supplied to the second die head 212.

A solvent is used for preparing the slurry for the active material layer and the slurry for the insulating layer. When N-methyl-2-pyrrolidone (NMP) is used as the solvent, peeling strength of the layer obtained by evaporating the solvent can be increased compared with the case of using an aqueous solvent. When N-methyl-2-pyrrolidone was used as a solvent, the solvent did not evaporate completely even if the solvent was evaporated in a subsequent step, and the obtained layer contains a slight amount of N-methyl-2-pyrrolidone.

The drying machine 203 is for evaporating the solvent from the slurry for the active material layer and the slurry for the insulating layer respectively discharged from the first die head 211 and the second die head 212. The slurries are dried by the evaporation of the solvent, whereby the active material layer 111 and an insulating layer 112 are formed.

Next, a manufacturing process of the electrode by means of the manufacturing apparatus shown in FIG. 6 will be described. For convenience of explanation, the slurry for the active material layer and the active material layer obtained therefrom are described as "active material layer 111" without distinguishing between them. Actually, the "active material layer 111" before drying means the slurry for the active material layer. Similarly, the "insulating layer 112" before drying means the slurry for the insulating layer.

Figure 6A:
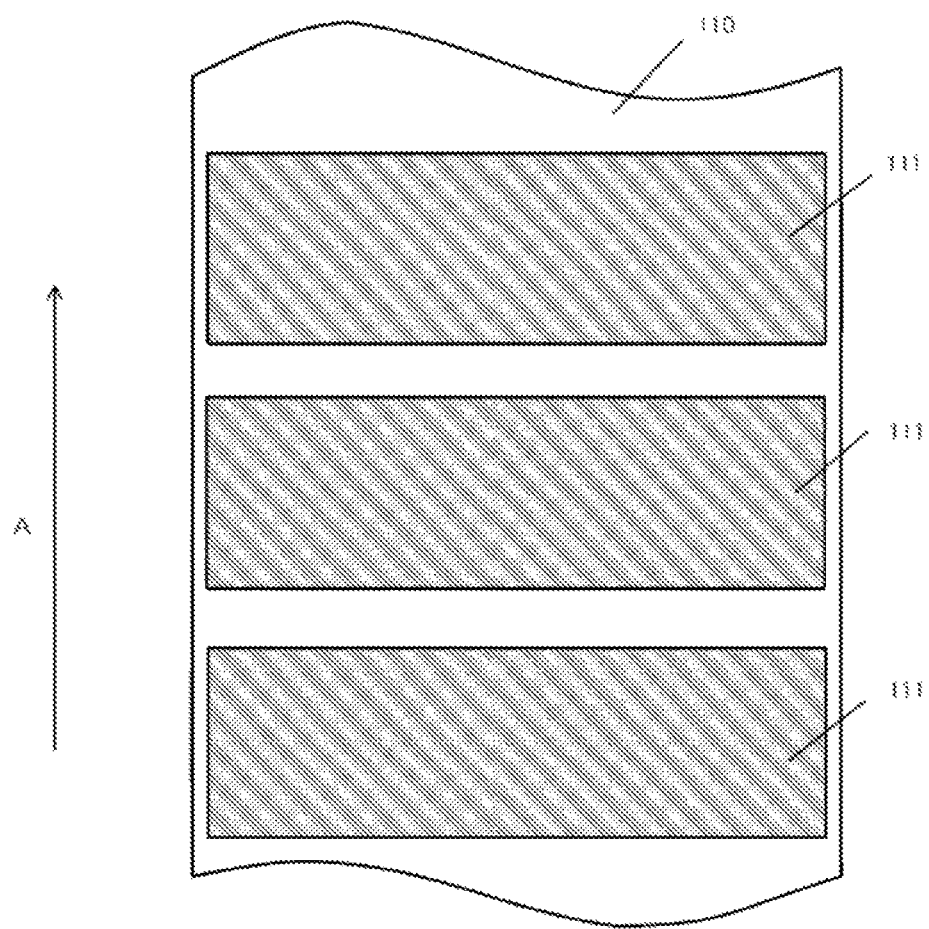
FIG. 6A is a plan view of a current collector at the stage of intermittently applying an active material layer on the current collector for explaining a manufacturing process of an electrode according to one embodiment of the present invention.
Figure 6B:
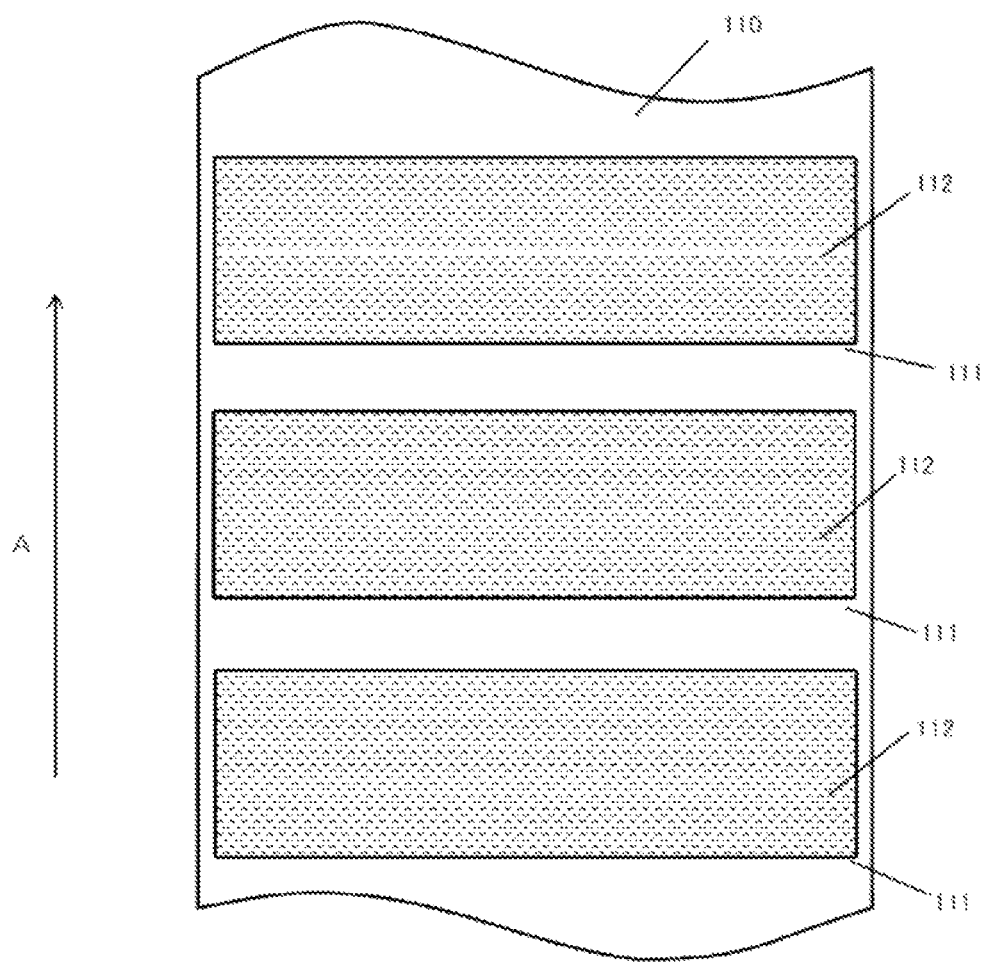
FIG. 6B is a plan view of a current collector at the stage of further applying an insulating layer on the active material layer on the current collector for explaining a manufacturing process of an electrode according to one embodiment of the present invention.

First, the active material layer 111 slurried with a solvent is intermittently applied to the surface of the long current collector 110 supported and fed on the backup roller 201 by using the first die head 211. As a result, as shown in FIG. 6A, a slurry of the active material layer 111 is applied to the current collector 110 at intervals in the feeding direction A of the current collector 110. By intermittently applying the active material layer 111 with the first die head 211, the active material layer 111 is applied in a rectangular shape having a longitudinal length parallel to the feeding direction A of the current collector 110 and a lateral length along a direction orthogonal thereto.

Next, when the leading end of the applied active material layer 111 in the feeding direction of the current collector 111 is fed to a position facing the discharge opening 212a of the second die head 212, the insulating layer 112 slurried with solvent is intermittently applied to the active material layer 111 by using the second die head 212. The insulating layer 112 is applied so that a part thereof is exposed at the end portion of the active material layer 111 when viewing the current collector 110 in its thickness direction. The insulating layer 112 is applied before the active material layer 111 is dried, that is, before the solvent of the active material layer 111 is evaporated. By intermittently applying the insulating layer 112 with the second die head 212, the insulating layer 112 is applied in a rectangular shape having a longitudinal length parallel to the feeding direction A of the current collector 110 and a lateral length along a direction perpendicular thereto.

In the present embodiment, the first die head 211 and the second die head 212 have the same width (the dimension in the direction orthogonal to the feeding direction A of the current collector 110) of the projecting openings 211a and 212a, and the active material layer 111 and the insulating layer 112 have the same applying width.

After applying the active material layer 111 and the insulating layer 112, the current collector 110 is fed to the drying machine 203, the solvents of the slurry for the active material layer and the slurry for the insulating layer slurry are evaporated in the drying machine 203. After evaporation of the solvent, the current collector 110 is fed to a roll press where the active material layer 111 and the insulating layer 112 are compression-molded. Thus, the active material layer 111 is formed simultaneously with the formation of the insulating layer 112.

Figure 6C:
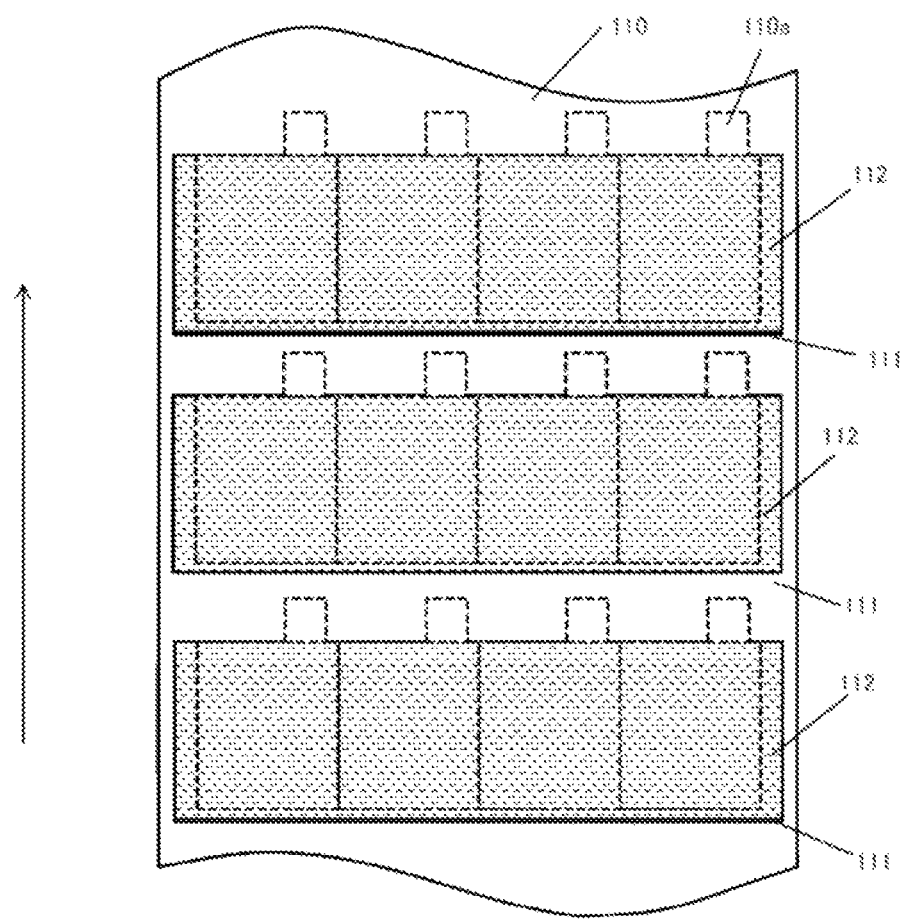
FIG. 6C is a plan view illustrating a cutting shape in a stage of cutting a current collector applied the active material layer and the insulating layer into a desired shape for explaining a manufacturing process of an electrode according to one embodiment of the present invention.

Finally, the current collector 110 is cut into a desired shape, as indicated by a broken line in FIG. 6C, having a rectangular portion in which the active material layer 111 and the insulating layer 112 are formed on the entire surface of the current collector 110 and an extension portion 110a made of the current collector 110 extending from the rectangular portion by an appropriate method such as punching. The electrode is thereby obtained. The cutting step may be carried out so as to obtain a desired shape by one time of processing or it may be carried out so as to obtain a desired shape by a plurality of times of processing.

Note that the current collector 110 having the active material layer 111 and the insulating layer 112 formed thereon is often wound around a roll and stored and/or transported until the next process. As described above, in the laminated structure of the current collector 110, the active material layer 111, and the insulating layer 112, peeling occurs between the current collector 110 and the active material layer 111 and its peeling strength is 10 mN/mm or more when the 90° peeling test is carried out. Therefore, it is possible to suppress peeling of the active material layer 111 from the current collector 110 and peeling of the insulating layer 112 from the active material layer 111 even when wound on a roll.

Although the present invention has been described with reference to one embodiment, the present invention is not limited to the above-described embodiments, and can be arbitrarily changed within the scope of the technical idea of the present invention.

Figure 7:
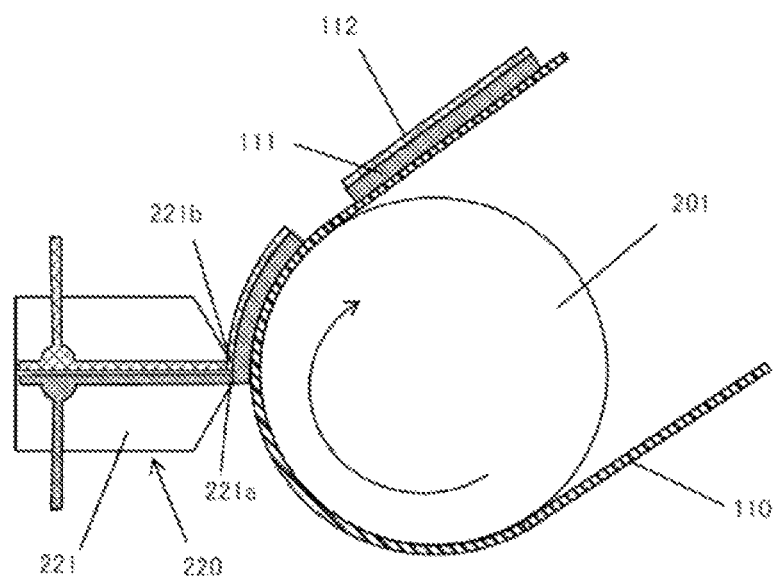
FIG. 7 is a schematic view of another embodiment of the electrode manufacturing apparatus according to the present invention.

For example, in the above embodiment, in order to apply the active material layer 111 and the insulating layer 112, a die coater 210 having two die heads 211 and 212 with discharge openings 211a and 212a as shown in FIG. 6 was used. However, as shown in FIG. 7, the active material layer 111 and the insulating layer 112 can be applied to the current collector 110 by using a die coater 220 having a single die head 221 with two discharge openings 221a and 221b.

The two discharge openings 221a and 221b are arranged at intervals in the rotation direction of the backup roller 201, that is, the feed direction of the current collector 110. The slurry for the active material layer is applied by the discharge opening 221a located on the upstream side in the feed direction of the current collector 110 and the slurry for the insulating layer is applied by the discharge opening 221b located on the downstream side. Therefore, the slurry for the active material layer and the slurry for the insulating layer are discharged respectively from the two discharge openings 221a and 221b, thereby it is possible to obtain a structure that the active material layer 111 is intermittently applied to the surface of the current collector 110 and the insulating layer 112 is applied with a part of the active material layer 111 exposed.

Furthermore, in the above embodiment, the case where the active material layer 111 and the insulating layer 112 are applied to one side of the current collector 110 has been described. However, it is possible to manufacture an electrode having the active material layer 111 and the insulating layer 112 on both surface of the current collector 110 by applying the active material layer 111 and the insulating layer 112 on the other side of the current collector 110 in a similar manner.

Further, the battery obtained by the present invention can be used in various uses. Some examples are described below.

[Battery Pack]

A plurality of batteries can be combined to form a battery pack. For example, the battery pack may have a configuration in which two or more batteries according to the present embodiment are connected in series and/or in parallel. The series number and parallel number of the batteries can be appropriately selected according to the intended voltage and capacity of the battery pack.

[Vehicle]

Figure 8:
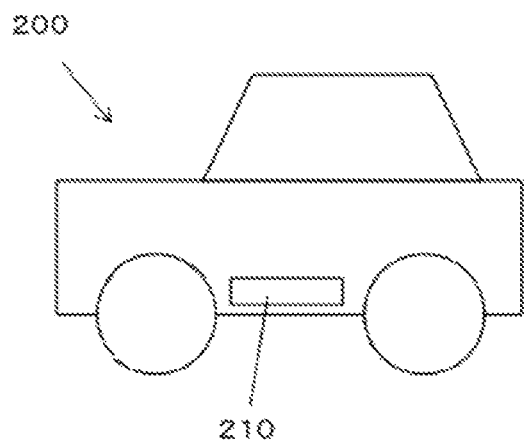
FIG. 8 is a schematic view showing an embodiment of an electric vehicle equipped with a battery.

The above-described battery or the battery pack thereof can be used for a vehicle. Examples of vehicles that can use batteries or assembled batteries include hybrid vehicles, fuel cell vehicles, and electric vehicles (four-wheel vehicles (commercial vehicles such as passenger cars, trucks and buses, and mini-vehicles, etc.), motorcycles (motorbike and tricycles). Note that the vehicle according to the present embodiment is not limited to an automobile, and the battery can also be used as various power sources for other vehicles, for example, transportations such as electric trains. As an example of such a vehicle, FIG. 8 shows a schematic diagram of an electric vehicle. The electric vehicle 200 shown in FIG. 8 has a battery pack 210 configured to satisfy the required voltage and capacity by connecting a plurality of the above-described batteries in series and in parallel.

[Power Storage Device]

Figure 9:
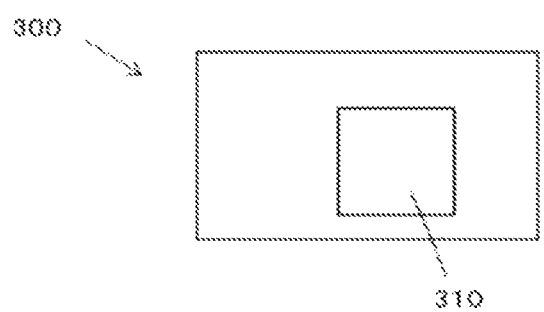
FIG. 9 is a schematic diagram showing an example of a power storage device equipped with a battery.

The above-described battery or the battery pack thereof can be used for a power storage device. Examples of the power storage device using the secondary battery or the battery pack thereof include a power storage device which is connected between a commercial power supply supplied to an ordinary household and a load such as a household electric appliance to use as a backup power source or an auxiliary power source in case of power outage, and a power storage device used for large-scale electric power storage for stabilizing electric power output with large time variation due to renewable energy such as photovoltaic power generation. An example of such a power storage device is schematically shown in FIG. 9. The power storage device 300 shown in FIG. 9 has a battery pack 310 configured to satisfy a required voltage and capacity by connecting a plurality of the above-described batteries in series and in parallel.

[Others]

Furthermore, the above-described battery or the battery pack thereof can be used as a power source of a mobile device such as a mobile phone, a notebook computer and the like.

The present invention will be described with reference to specific examples below. However, the present invention is not limited to the following examples.

Example 1

(Preparation of Insulating Applied Positive Electrode)

$LiNi_{0.8}Mn_{0.15}Co_{0.05}$, a carbon conductive agent (acetylene black) and polyvinylidene fluoride (PVdF) as a binder were dispersed in N-methyl-2-pyrrolidone at a weight ratio of 90:5:5 to prepare a slurry for a positive electrode active material layer. This slurry was applied to the surface of a positive electrode current collector foil made of aluminum and dried to form a positive electrode active material layer (PAM 1). A positive electrode active material layer was similarly formed on the back surface of the positive electrode current collector foil.

Subsequently, alumina and polyvinylidene fluoride (PVdF) as a binder were dispersed in N-methyl-2-pyrrolidone at a weight ratio of 90:10 to prepare a slurry for an insulating layer. This was applied to the positive electrode active material layer and dried to form an insulating layer (INS 1). An insulating layer was similarly formed on the positive electrode active material layer on the back side of the positive electrode current collector foil. Subsequently, the whole of the positive electrode current collector foil, the positive electrode active material layer and the insulating layer were compression-molded and further cut into a predetermined shape to prepare a plurality of positive electrodes.

(Measurement of Peeling Strength)

One of the obtained plurality of positive electrodes was cut out as a sample having a width of 20 mm and a length of 100 mm, and 90° peeling test was carried out using this sample under an ambient temperature environment (15° C. to 25° C.). The 90° peeling test was carried out as follows. First, the sample was fixed on the upper surface of a flat sample stage using a double-sided tape (NWBB-20 manufactured by Nichiban Co., Ltd.) having the same width as the sample so that the double-sided tape was not peeled off. At that time, only the portion of the sample from the one end to 80 mm in the length direction was fixed to the sample stage, and the remaining portion of 20 mm length was not fixed as a clamping margin. Next, the clamping margin of the sample was held by a chuck, and in that state, the chuck was moved at a speed of 100 mm/min in a direction away from the sample stage perpendicular to the upper surface of the sample stage, the sample was peeled off from the sample stage, and the maximum load at that time was measured. For 90° peeling test, a tensile and compression tester (model number FGS-20TV, manufactured by Nidec Shimpo Co., Ltd.) was used. In the 90° peeling test, the peeling strength and layer and location where peel was occurred was determined. The peeling strength is a value converted into a force per 1 mm width of a sample by dividing the maximum load measured when the sample is peeled as described above by 20 mm which is the width of the sample. The unit of the peeling strength is expressed in Nm/mm.

(Preparation of Negative Electrode)

Natural graphite, sodium carboxymethyl methyl cellulose as a thickener and styrene butadiene rubber as a binder were mixed in an aqueous solution at a weight ratio of 97:1:2 to prepare a slurry for a negative electrode active material layer. This was applied to the surface of a negative electrode current collector foil made of copper and dried to form a negative electrode active material layer (NAM 1). A negative electrode active material layer was similarly formed on the back surface of the negative electrode current collector foil. Subsequently, the whole of negative electrode current collector foil and the negative electrode active material layer were compression-molded and further cut into a predetermined shape to prepare a plurality of negative electrodes.

(Preparation of Electrolytic Solution)

For a non-aqueous solvent of the electrolytic solution, a non-aqueous solvent obtained by mixing ethylene carbonate (EC) and diethyl carbonate (DEC) in a volume ratio of 30:70 was used. As a supporting salt, $LiPF_6$ was dissolved so as to have a concentration of 1 M.

(Preparation of Battery)

The positive electrode and the negative electrode were stacked via the base of the separator to prepare an electrode assembly. As the separator, a microporous separator made of polypropylene and having a thickness of 25 μm was used. The size of the electrode assembly was adjusted so that the initial charge capacity of the cell was 1 Ah. Terminals for taking out current were connected to each of the stacked positive electrode and negative electrode, and they were accommodated in a casing package which is a laminated film of aluminum and resin. After injecting the electrolytic solution into the casing, the casing was sealed under reduced pressure. A battery was prepared by the above steps.

(160° C. Heating Test)

After the prepared battery was charged to 4.2 V, heating test at 160° C. was carried out. The heating rate was 10° C./min, and the temperature was maintained for 30 minutes after reaching 160° C.

Example 2

A positive electrode having an insulating layer was prepared in the same manner as Example 1 expect that the positive electrode active material was changed from $LiNi_{0.8}Mn_{0.15}Co_{0.05}$ that was used in Example 1 to $LiNi_{0.8}Ta_{0.15}Al_{0.05}$ and that a positive active material layer (PAM 2) was formed using this positive active material. Further, a battery was prepared in the same manner as Example 1 except that the above positive electrode was used. The peeling test of the prepared positive electrode and the 160° C. heating test of the prepared battery were carried out in the same manner as Example 1.

Example 3

A positive electrode having an insulating layer was prepared in the same manner as Example 1 except that the positive electrode active material was changed from $LiNi_{0.8}Mn_{0.15}Co_{0.05}$ that was used in Example 1 to $LiNi_{0.5}Mn_{0.3}Co_{0.2}$ and that a positive electrode active material layer (PAM 3) was formed using this positive electrode active material. Further, a battery was prepared in the same manner as Example 1 except that this positive electrode was used. The peeling test of the prepared positive electrode and the 160° C. heating test of the prepared battery were carried out in the same manner as Example 1.

Example 4

(Preparation of Insulation Coated Negative Electrode)

Graphite, sodium carboxymethyl methyl cellulose as a thickener and styrene butadiene rubber as a binder were mixed in an aqueous solution at a weight ratio of 97:1:2 to prepare a slurry for a negative electrode active material layer. The slurry was applied to the surface of a negative electrode current collector foil made of copper and dried to form a negative electrode active material layer (NAM 1). A negative electrode active material layer was similarly formed on the back surface of the negative electrode current collector foil. Subsequently, the negative electrode active material layers formed on both sides of the negative electrode current collector foil were compression-molded.

Subsequently, alumina and polyvinylidene fluoride (PVdF) as a binder were dispersed in N-methyl-2-pyrrolidone at a weight ratio of 90:10 to prepare a slurry for an insulating layer. This slurry was applied to the negative electrode active material layer and dried to form an insulating layer (INS 1). An insulating layer was similarly formed on the negative electrode active material layer on the back side of the negative electrode current collector foil. Next, the insulating layers formed on both sides of the negative electrode current collector foil were compression-molded and further cut into a predetermined shape to prepare a plurality of negative electrodes. For the prepared negative electrode, the peeling test was carried out in the same manner as Example 1.

(Preparation of Positive Electrode)

$LiNi_{0.8}Mn_{0.15}Co_{0.05}$, a carbon conductive agent (acetylene black) and polyvinylidene fluoride (PVdF) as a binder were dispersed in N-methyl-2-pyrrolidone at a weight ratio of 90:5:5 to prepare a slurry for a positive electrode active material layer. This slurry was applied to the surface of a positive electrode current collector foil made of aluminum and dried to form a positive electrode active material layer (PAM 1). A positive electrode active material layer was similarly formed on the back surface of the positive electrode current collector foil. Subsequently, the whole of the positive electrode current collector foil and the positive electrode active material layer was compression-molded and further cut into a predetermined shape to prepare a plurality of positive electrodes.

(Preparation of Battery)

After preparation of the negative electrode and the positive electrode, an electrolytic solution and a battery were prepared in the same manner as Example 1. Using the prepared battery, the 160° C. heating test was carried out under the same conditions as Example 1.

Example 5

Graphite and polyacrylic acid as a binder were mixed in an aqueous solution at a weight ratio of 95:5 to prepare a slurry for a negative electrode active material layer. A negative electrode was prepared in the same manner as Example 4 except that the negative electrode active material layer (NAM 2) was formed using this slurry, and the peeling test of the negative electrode was carried out. In addition, a battery was prepared in the same manner as Example 4 except that the above negative electrode was used, and the 160° C. heating test was carried out.

Example 6

Graphite, Si and polyacrylic acid as a binder were mixed in an aqueous solution at a weight ratio of 92:3:5 to prepare a slurry for a negative electrode active material layer. A negative electrode was prepared in the same manner as Example 4 except that the negative electrode active material layer (NAM 3) was formed using this slurry, and the peeling test was carried out. In addition, a battery was prepared in the same manner as Example 4 except that the above negative electrode was used, and the 160° C. heating test was carried out.

Example 7

Alumina and polyacrylic acid (PAA) as a binder were mixed in an aqueous solution at a weight ratio of 93:7 to prepare a slurry for an insulating layer. A negative electrode was prepared in the same manner as Example 4 except that the negative electrode insulating layer (INS 2) was formed using this slurry, and the peeling test was carried out. In addition, a battery was prepared in the same manner as Example 4 except that the above negative electrode was used, and the 160° C. heating test was carried out.

Example 8

Graphite and polyvinylidene fluoride (PVdF) as a binder were dispersed in N-methyl-2-pyrrolidone at a weight ratio of 95:5 to prepare a slurry for a negative electrode active material. This slurry was applied to the surface of a negative electrode current collector foil made of copper and dried to form a negative electrode active material layer (NAM 4). A negative electrode active material layer was similarly formed on the back surface of the negative electrode current collector foil.

Subsequently, alumina and polyimide as a binder were dispersed in N-methyl-2-pyrrolidone at a weight ratio of 90:10 to prepare a slurry for an insulating layer. This slurry was applied to the negative electrode active material layer and dried to form an insulating layer (INS 3). An insulating layer was similarly formed on the negative electrode active material layer on the back side of the negative electrode current collector foil. Next, the whole of the negative electrode current collector foil, the negative electrode active material layer and the insulating layer were compression-molded and further cut into a predetermined shape to prepare a plurality of negative electrodes. For the prepared negative electrode, the peeling test was carried out in the same manner as Example 4. In addition, a battery was prepared in the same manner as in Example 4 except that the above negative electrode was used, and the 160° C. heating test was carried out.

Example 9

Graphite, SiO and polyacrylic acid as a binder were mixed in an aqueous solution at a weight ratio of 28:67:5 to prepare a slurry for a negative electrode active material layer. A negative electrode was prepared in the same manner as Example 4 except that the negative electrode active material layer (NAM 6) was formed using this slurry, and the peeling test was carried out. In addition, a battery was prepared in the same manner as Example 4 except that the above negative electrode was used, and the 160° C. hearing test was carried out.

Comparative Example 1

Graphite, sodium carboxymethyl methyl cellulose as a thickener, and styrene butadiene rubber as a binder were mixed in an aqueous solution at a weight ratio of 97.6:1.2:1.2 to prepare a slurry for a negative electrode active material layer. A negative electrode was prepared in the same manner as Example 4 except that the negative electrode active material layer (NAM 5) was formed using this slurry, and the peeling test of the negative electrode was carried out. In addition, a battery was prepared in the same manner as Example 4 except that the above negative electrode was used, and the 160° C. heating test was carried out.

Comparative Example 2

Alumina and polyvinylidene fluoride (PVdF) as a binder were dispersed in N-methyl-2-pyrrolidone at a weight ratio of 97:3 to prepare a slurry for an insulating layer. A positive electrode was prepared in the same manner as Example 1 except that the insulating layer (INS 4) of the positive electrode was formed using this slurry, and the peeling test was carried out. In addition, a battery was prepared in the same manner as Example 1 except that the above positive electrode was used, and the 160° C. heating test was carried out.

Comparative Example 3

A positive electrode was prepared in the same manner as Example 1 except that an insulating layer (INS 5) for a positive electrode was formed by using a slurry for the insulating layer in which alumina and polyvinylidene fluoride (PVdF) as a binder were dispersed in N-methyl-2-pyrrolidone at a weight ratio of 92:8, and that a drying process and a compression-molding process ware added after a slurry for a positive electrode active material layer was applied to both surfaces of the positive electrode current collector foil The peeling test was carried out on the prepared positive electrode. In addition, a battery was prepared in the same manner as Example 1 except that the above positive electrode was used, and the 160° C. heating test was carried out.

Table 1 shows the layer configurations of the positive electrode and the negative electrode, the results of the peeling test and the results of the 160° C. heating test of Examples 1 to 8 and Comparative Examples 1 to 3.

negative electrode that are in contact with the separator so as to be pulled by the separator. By this contracting force, in the negative electrode, the insulating layer is peeled from the active material layer so as to be pulled by the separator and

TABLE 1

| | | | Electrode having insulating layer | | | |
|---|---|---|---|---|---|---|
| | Positive Electrode | Negative Electrode | Applying Insulation Layer | Peeled Portion | Peeling Strength (mN/mm) | 160° C. Heating Test |
| Example 1 | Al/PAM1/INS1 | Cu/NAM1 | before compression | CCF - AML | 21 | No smoking/firing |
| Example 2 | Al/PAM2/INS1 | Cu/NAM1 | before compression | CCF - AML | 18 | No smoking/firing |
| Example 3 | Al/PAM3/INS1 | Cu/NAM1 | before compression | CCF - AML | 20 | No smoking/firing |
| Example 4 | Al/PAM1 | Cu/NAM1/INS1 | after compression | CCF - AML | 15 | No smoking/firing |
| Example 5 | Al/PAM1 | Cu/NAM2/INS1 | after compression | CCF - AML | 12 | No smoking/firing |
| Example 6 | Al/PAM1 | Cu/NAM3/INS1 | after compression | CCF - AML | 11 | No smoking/firing |
| Example 7 | Al/PAM1 | Cu/NAM1/INS2 | after compression | CCF - AML | 15 | No smoking/firing |
| Example 8 | Al/PAM1 | Cu/NAM4/INS3 | before compression | CCF - AML | 30 | No smoking/firing |
| Example 9 | Al/PAM1 | Cu/NAM6/INS1 | After compression | CCF - AML | 35 | No smoking/firing |
| Comparative Example 1 | Al/PAM1 | Cu/NAM5/INS1 | after compression | CCF - AML | 9.2 | Smoking |
| Comparative Example 2 | Al/PAM3/INS4 | Cu/NAM1 | before compression | AML - IL | 10 | Smoking |
| Example 3 | Al/PAM3/INS5 | Cu/NAM1 | after compression | AML - IL | 12 | Smoking |

In Table 1, the column of the positive electrode represents the material of "positive electrode current collector foil/positive electrode active material layer/insulating layer". Similarly, the column of the negative electrode represents the material of "negative electrode current collector foil/negative electrode active material layer/insulating layer". The details of PAM 1 to PAM 3, NAM 1 to NAM 5 and INS 1 to INS 5 are as described in the above-mentioned Examples 1 to 9 and Comparative Examples 1 to 3.

In each of Examples 1 to 9, peeling occurred between the current collector foil and the active material layer in the peel test, and the peeling strength thereof was 10 mN/mm or more. Furthermore, smoking and firing from the battery were not confirmed in the 160° C. heating test. On the other hand, in Comparative Examples 2 and 3, although the peeling strength was 10 mN/mm or more, peeling occurred between the active material layer and the insulating layer, and smoke was generated from the battery in the 160° C. heating test. In Comparative Example 1, peeling occurred between the current collector foil and the active material layer as in Examples 1 to 8, but the peeling strength was relatively small as 9.2 mN/mm, and smoking was generated in the heating test. From the above, it was found that smoking and heat generation can be effectively suppressed even though the temperature of the battery is high by configuring the electrode having the insulating layer further on the active material layer such that peeling occurs between the current collector foil and the active material layer and its peeling strength is 10 mN/mm or more when 90° peeling test was carried out.

Here, in the Comparative Examples 2 and 3, a mechanism in which smoke was generated in the heating test will be considered. In Comparative Examples 2 and 3, peeling occurred between the active material layer and the insulating layer, which means that the adhesion force between the active material layer and the insulating layer is lower than the adhesion force between active material layer and the current collecting foil. In the heating test, the positive electrode, the negative electrode and the separator are heated, and a shrinking force in the in-plane direction is exerted on the separator by heating. At the same time, contracting force acts also on the positive electrode and the the active material layer is partially exposed. As a result, it is considered that a short circuit occurred between the positive electrode and the negative electrode, resulting in smoking.

Some or all of the above embodiments may also be described as follows, but the disclosure of the present application is not limited to the following further exemplary embodiments.

Further Exemplary Embodiment 1

An electrode for a battery comprising:
a current collector (110),
an active material layer (111) formed on at least one surface of the current collector (110),
an insulating layer (112) formed on a surface of the active material layer (111), and
wherein peeling occurs between the current collector (110) and the active material layer (111) and a peeling strength thereof is 10 mN/mm or more when a 90° peeling test is carried out at a peeling rate of 100 mm/min.

Further Exemplary Embodiment 2

The electrode according to Further exemplary embodiment 1, wherein the current collector (110) and the active material layer (111) are the current collector (110) for a positive electrode.

Further Exemplary Embodiment 3

The electrode according to Further exemplary embodiment 2, wherein the active material layer (111) for the positive electrode includes polyvinylidene fluoride as a binder.

Further Exemplary Embodiment 4

The electrode according to Further exemplary embodiment 1, wherein the current collector (110) and the active material layer (111) are the current collector (110) and the active material layer (111) for a negative electrode.

Further Exemplary Embodiment 5

The electrode according to Further exemplary embodiment 4, wherein the active material layer (111) for the negative electrode includes at least one of styrene butadiene rubber, polyacrylic acid and polyvinylidene fluoride as a binder.

Further Exemplary Embodiment 6

The electrode according to any one of Further exemplary embodiments 1 to 5, wherein the active material layer (111) includes N-methyl-2-pyrrolidone.

Further Exemplary Embodiment 7

A battery comprising:
at least one positive electrode (11),
at least one negative electrode (12) disposed to face the positive electrode (11), and
wherein at least one of the positive electrode (11) and the negative electrode (12) includes a current collector (110), an active material layer (111) formed on at least one surface of the current collector (110), and an insulating layer (112) formed on a surface of the active material layer (111), and peeling occurs between the current collector (110) and the active material layer (111) and a peeling strength thereof is 10 mN/mm or more when a 90° peeling test is carried out at a peeling rate of 100 mm/min.

Further Exemplary Embodiment 8

The battery according to Further exemplary embodiment 7, wherein the positive electrode (11) and the negative electrode (12) are disposed to face each other with the insulating layer (112) interposed therebetween.

Further Exemplary Embodiment 9

The battery according to Further exemplary embodiment 7 or 8, further comprising a separator (13) disposed between the positive electrode (11) and the negative electrode (12).

Further Exemplary Embodiment 10

The battery according to any one of Further exemplary embodiments 7 to 9, wherein the active material layer (111) includes polyvinylidene fluoride as a binder.

Further Exemplary Embodiment 11

The battery according to any one of Further exemplary embodiments 7 to 10, wherein the active material layer (111) includes N-methyl-2-pyrrolidone.

Further Exemplary Embodiment 12

A method for manufacturing an electrode for a battery, the method comprising;
forming an active material layer (111) on at least one surface of a current collector (110),
forming an insulating layer (112) such that the insulating layer (112) is finally laminated on a surface of the active material layer (111), and
wherein at least one of a material of the active material layer (111), a formation condition of the active material layer (111), a material of the insulating layer (112) and a formation condition of the insulating layer (112) is determined such that peeling occurs between the current collector (110) and the active material layer (111) and a peeling strength thereof is 10 mN/mm or more when a 90° peeling test is carried out at a peeling rate of 100 mm/min.

Further Exemplary Embodiment 13

The method for manufacturing the electrode according to Further exemplary embodiment 12,
wherein the step of forming the active material layer (111) comprises:
applying a mixture for the active material layer in which an active material and a binder are dispersed in a solvent,
drying the mixture for the active material layer after the mixture is applied, and
compression-molding the mixture for the active material layer after the mixture is dried, and
wherein the step of forming the insulating layer (112) comprises:
applying a mixture for the insulating layer in which an insulating material and a binder are dispersed in a solvent,
drying the mixture for the insulating layer after the mixture is applied, and
compression-molding the mixture for the insulating layer after the mixture is dried.

Further Exemplary Embodiment 14

The method for manufacturing the electrode according to Further exemplary embodiment 13,
wherein the step of applying the mixture for the active material layer,
the step of drying the mixture for the active material layer,
the step of compression-molding the mixture for the active material layer,
the step of applying the mixture for the insulating layer,
the step of drying the mixture for the insulating layer and
the step of compression-molding the mixture for the insulating layer
are carried out in this order.

Further Exemplary Embodiment 15

The method for manufacturing the electrode according to Further exemplary embodiment 13,
wherein the step of applying the mixture for the active material layer,
the step of drying the mixture for the active material layer,
the step of applying the mixture for the insulating layer and
the step of drying the mixture for the insulating layer
are carried out in this order, and
wherein the step of compression-molding the mixture for the active material layer and the step of compression-molding the mixture for the insulating layer are carried out simultaneously after the step of drying the mixture for the insulating layer.

Further Exemplary Embodiment 16

The method for manufacturing the electrode according to Further exemplary embodiment 13,
wherein the step of applying the mixture for the active material layer and
the step of applying the mixture for the insulating layer are carried out in this order,
the step of drying the mixture for the active material layer and the step of drying the mixture for the insulating layer are carried out simultaneously after the step of applying the mixture for the insulating layer, and
the step of compression-molding the mixture for the active material layer and the step of compression-molding the mixture for the insulating layer are carried out simultaneously thereafter.

Further Exemplary Embodiment 17

The method for manufacturing the electrode according to any one of Further exemplary embodiments 13 to 16, wherein the mixture for the active material layer includes polyvinylidene fluoride as the binder.

Further Exemplary Embodiment 18

The method for manufacturing the electrode according to any one of Further exemplary embodiments 13 to 17, wherein the mixture for the active material layer includes N-methyl-2-pyrrolidone as the solvent.

EXPLANATION OF SYMBOLS

1 Battery
10 Electrode assembly
10a Positive electrode tab
10b Negative electrode tab
11 Positive electrode
12 Negative electrode
13 Separator
21, 22 Casing member
31 Positive electrode terminal
32 Negative electrode terminal
110 Current collector
110a Extended portion
111 Active material layer
112 Insulating layer
201 Backup roller
210, 220 Die coater
211, 212, 221 Die head
211a, 212a, 221a Discharge opening

The invention claimed is:

1. A battery comprising:
at least one positive electrode;
a separator; and
at least one negative electrode disposed to face the positive electrode via the separator,
wherein at least one of the positive electrode and the negative electrode comprises:
a current collector,
an active material layer formed on at least one surface of the current collector, and
an insulating layer adhered to a surface of the active material layer,
wherein a peeling strength between the active material layer and the insulating layer is higher than a peeling strength between the current collector and the active material layer,
peeling occurs between the current collector and the active material layer and a peeling strength thereof is 11 mN/mm or more in a 90° peeling test at a peeling rate of 100 mm/min, and
the insulating layer includes non-conductive particles and a binder, a mass percentage of the binder in the insulating layer is 10 to 20 mass %, the binder adhering the insulating layer to the surface of the active material layer, and
wherein neither the positive electrode, nor the negative electrode, nor the insulating layer are adhered to the separator.

2. The battery according to claim 1, wherein the current collector is a positive electrode current collector, the active material layer is a positive electrode active material layer, and the binder in the insulating layer is polyvinylidene fluoride.

3. The battery according to claim 1, wherein the positive electrode active material layer includes a positive electrode active material and a positive electrode binder, and the amount of the positive electrode binder is 2 to 15 parts by mass relative to 100 parts by mass of the positive electrode active material.

4. The battery according to claim 1, wherein the current collector is a negative electrode current collector, the active material layer is a negative electrode active material layer, and the insulating layer includes at least one of polyimide, polyacrylic acid and polyvinylidene fluoride as the binder.

5. The battery according to claim 4, wherein the binder for the insulating layer is polyimide.

6. The battery according to claim 4, wherein the negative electrode active material layer includes a negative electrode active material and a negative electrode binder, and the mass percentage of the negative electrode binder in the active material layer is 2 mass % or more.

7. A method for manufacturing a battery, the method comprising;
preparing at least one positive electrode,
preparing a separator,
preparing at least one negative electrode, and
disposing the positive electrode and the negative electrode facing each other via the separator,
wherein the step of preparing the positive electrode comprises:
  forming a positive electrode active material layer on at least one surface of a current collector, and
  forming an insulating layer such that the insulating layer is finally adhered on a surface of the positive electrode active material layer,
wherein the step of forming the positive electrode active material layer comprises:
  applying a mixture for the positive electrode active material layer in which a positive electrode active material and a positive electrode binder are dispersed in a solvent, and drying the mixture for the positive electrode active material layer after the mixture is applied, and
wherein the step of forming the insulating layer comprises:
  applying a mixture for the insulating layer, in which an insulating material and a binder are dispersed in a solvent, onto the surface of the positive electrode active material layer, and drying the mixture for the insulating layer after the mixture is applied, and wherein a peeling strength between the positive electrode active material layer and the insulating layer is higher than a peeling strength between the current collector and the positive electrode active material layer, peeling occurs between the current collector and the positive electrode active material layer and a peeling strength thereof is 11 mN/mm or more in a 90° peeling test at a peeling rate of 100 mm/min, and a mass percentage of the binder in the insulating layer is 10 to 20 mass %, the binder adhering the insulating layer to the surface of the positive electrode active material layer, and wherein neither the positive electrode, nor the negative electrode, nor the insulating layer are adhered to the separator.

8. The method for manufacturing the battery according to claim 7, wherein the step of forming the positive electrode active material layer further comprises compression-molding the mixture for the insulating layer after the mixture is dried.

9. The method for manufacturing the battery according to claim 8, wherein the step of applying the mixture for the positive electrode active material layer, the step of drying the mixture for the positive electrode active material layer, the step of applying the mixture for the insulating layer onto the surface of the positive electrode active material layer, the step of drying the mixture for the insulating layer and the step of compression-molding the mixture for the insulating layer are carried out in this order.

10. The method for manufacturing the battery according to claim 7, wherein the amount of the positive electrode binder is 2 to 15 parts by mass relative to 100 parts by mass of the positive electrode active material.

11. A method for manufacturing a battery, the method comprising;

preparing a separator, preparing at least one positive electrode and at least one negative electrode, and disposing the positive electrode and the negative electrode facing each other via the separator, wherein the step of preparing the positive electrode comprises forming a positive electrode active material layer on at least one surface of a current collector, and forming an insulating layer such that the insulating layer is finally adhered on a surface of the positive electrode active material layer, wherein the step of forming the negative electrode active material layer comprises:

applying a mixture for the negative electrode active material layer in which a negative electrode active material and a negative electrode binder are dispersed in a solvent, and drying the mixture for the negative electrode active material layer after the mixture is applied, and the step of forming the insulating layer comprises:

applying a mixture for the insulating layer, in which an insulating material and a binder are dispersed in a solvent, onto the surface of the negative electrode active material layer, and drying the mixture for the insulating layer after the mixture is applied, and wherein a peeling strength between the negative electrode active material layer and the insulating layer is higher than a peeling strength between the current collector and the negative electrode active material layer, peeling occurs between the current collector and the negative electrode active material layer and a peeling strength thereof is 11 mN/mm or more in a 90° peeling test at a peeling rate of 100 mm/min, and a mass percentage of the binder in the insulating layer is 10 to 20 mass %, the binder adhering the insulating layer to the surface of the negative electrode active material layer, and wherein neither the positive electrode, the negative electrode, nor the insulating layer are adhered to the separator.

12. The method for manufacturing the battery according to claim 11, wherein the step of forming the negative electrode active material layer further comprises compression-molding the mixture for the negative electrode active material layer after the mixture for the negative electrode active material layer is dried, and compression-molding the mixture for the insulating layer after the mixture for the insulating layer is dried.

13. The method for manufacturing the battery according to claim 12, wherein the step of applying the mixture for the negative electrode active material layer, the step of drying the mixture for the negative electrode active material layer, the step of compression-molding the mixture for the negative electrode active material layer, the step of applying to the surface of the negative electrode active material layer the mixture for the insulating layer, the step of drying the mixture for the insulating layer and the step of compression-molding the mixture for the insulating layer are carried out in this order.

14. The battery according to claim 1, wherein the separator is a microporous separator consisting of polypropylene.

15. The battery according to claim 2, wherein the peeling strength between the positive electrode current collector and the positive electrode active material layer is 18 mN/mm or more.

16. The method or manufacturing the battery according to claim 7, wherein the peeling strength between the positive electrode current collector and the positive electrode active material layer is 18 mN/mm or more.

17. The battery according to claim 1, wherein the insulating layer does not directly contact the separator.

18. The method for manufacturing the battery according to claim 7, wherein the insulating layer does not directly contact the separator.

19. The method for manufacturing the battery according to claim 11, wherein the insulating layer does not directly contact the separator.

* * * * *